(12) United States Patent
Kishimoto

(10) Patent No.: US 10,564,454 B2
(45) Date of Patent: Feb. 18, 2020

(54) METHOD FOR ATTACHING DISPLAY PANEL AND METHOD FOR MANUFACTURING DISPLAY APPARATUS

(71) Applicant: Sakai Display Products Corporation, Osaka (JP)

(72) Inventor: Katsuhiko Kishimoto, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 15/779,813

(22) PCT Filed: Nov. 8, 2017

(86) PCT No.: PCT/JP2017/040311
§ 371 (c)(1),
(2) Date: Dec. 13, 2018

(87) PCT Pub. No.: WO2019/092818
PCT Pub. Date: May 16, 2019

(65) Prior Publication Data
US 2019/0317357 A1    Oct. 17, 2019

(51) Int. Cl.
*G02F 1/1333* (2006.01)
*G02F 1/1345* (2006.01)
*G02F 1/1337* (2006.01)

(52) U.S. Cl.
CPC .. *G02F 1/133308* (2013.01); *G02F 1/133305* (2013.01); *G02F 1/133711* (2013.01)

(58) Field of Classification Search
CPC ............ B60K 35/00; B60K 2370/1529; B60K 2370/785; B60K 2370/81;
(Continued)

(56) References Cited

U.S. PATENT DOCUMENTS

2005/0185116 A1  8/2005  Higashi et al.
2006/0109614 A1  5/2006  Lee et al.
(Continued)

FOREIGN PATENT DOCUMENTS

EP   2085857 A1   8/2009
JP   S5025486 U   3/1975
(Continued)

OTHER PUBLICATIONS

PCT International Search Report, PCT Application No. PCT/JP2017/040311, Japan Patent Office, dated Feb. 6, 2018.
(Continued)

*Primary Examiner* — Thoi V Duong
(74) *Attorney, Agent, or Firm* — Snell & Wilmer L.L.P.

(57) ABSTRACT

A method for attaching display panel comprises: preparing a frame-shaped body comprising a first rod-like member and two second rod-like members, the two second rod-like members being substantially parallel to each other and crossing the first rod-like member; bonding the first rod-like member and the two second rod-like members to a given plane surface or a given curved surface; and moving a display panel having a width to be supported between the two second rod-like members from one of the ends of two second rod-like members towards the first rod-like member along a first surface of the two second rod-like members and a second surface of the two second rod-like members, the first surface and the second surface facing each other.

9 Claims, 16 Drawing Sheets

(58) Field of Classification Search
CPC ...... B60K 2370/152; B60K 2370/1523; B60K 2370/1533; B60K 2370/42; B60K 2370/46; B60K 2370/563; B60K 2370/70; B60K 2370/771; B60K 2370/816; B60K 37/04; B60K 2700/00; B60R 1/00; B60R 1/04; B60R 1/08; B60R 2300/205; B60R 2300/308; B60R 11/0235; B60R 2001/1253; B60R 2011/0005; B60R 2011/0026; B60R 2011/0028; B60R 2011/0035; G09G 2380/10; G09G 2380/02; G02F 1/133305; G02F 1/133308; G02F 1/13; G02F 1/1313; G02F 1/1333; G02F 1/1345; G02F 1/13452; G02F 2001/133325; G02F 2202/28; G06F 1/1607; G06F 1/1637; G09F 9/00; H05K 5/02

See application file for complete search history.

(56) References Cited

U.S. PATENT DOCUMENTS

| | | |
|---|---|---|
| 2007/0193094 A1 | 8/2007 | Noor |
| 2008/0084657 A1 | 4/2008 | Baba et al. |
| 2011/0045872 A1* | 2/2011 | Simmons ............... G02B 27/01 455/557 |
| 2012/0159825 A1 | 6/2012 | Pitcher et al. |
| 2015/0219942 A1 | 8/2015 | Lee |

FOREIGN PATENT DOCUMENTS

| | | |
|---|---|---|
| JP | S63107480 U | 7/1988 |
| JP | H09127490 A | 5/1997 |
| JP | H110312159 A | 11/1998 |
| JP | H111258599 A | 9/1999 |
| JP | 2000089226 A | 3/2000 |
| JP | 2005208492 A | 8/2005 |
| JP | 2006146214 A | 6/2006 |
| JP | 2008191256 A | 8/2008 |
| JP | 3149405 U | 3/2009 |
| JP | 2013088634 A | 5/2013 |
| JP | 2016097650 A | 5/2016 |

OTHER PUBLICATIONS

English Translation of PCT International Search Report, PCT Application No. PCT/JP2017/040311, Japan Patent Office, dated Feb. 6, 2018.

* cited by examiner

METHOD FOR ATTACHING DISPLAY PANEL AND METHOD FOR MANUFACTURING DISPLAY APPARATUS

CROSS-REFERENCE TO RELATED APPLICATIONS

This patent application is a U.S. National Stage of International Application No. PCT/JP2017/040311, filed on Nov. 8, 2017 (pending).

TECHNICAL FIELD

The present invention relates to a method for attaching a display panel and a method for manufacturing a display apparatus.

BACKGROUND ART

In recent years, with a request for thinning relative to liquid crystal display apparatus and organic EL display apparatus or the like and an expansion of use for these flat display apparatuses, the spread of thin and preferably flexible display panels has been accelerated. In many cases, thin display panel is used in a state in which the display panel is bonded to an arbitrary supporting member in order to obtain a shape retaining property or a mechanical strength, or according to a specific circumstance in each situation of use. For example, in Patent Document 1, there is disclosed a method for bonding an image display panel such as a liquid crystal display panel with a window glass used for digital signage. In the method disclosed in Patent Document 1, an image display panel disposed to be spaced from a window glass via an elastic member or the like is pressed towards the window glass while being elastically deformed by rolling of a roller from one end to the other end of the image display panel. Consequently, the image display panel and the window glass are bonded with each other via a layer including a photocurable resin.

PRIOR ART DOCUMENT

Patent Document

Patent Document 1: JP 2016-97650 A

SUMMARY OF THE INVENTION

Problem to be Solved by the Invention

It is very difficult to detach, from a supporting member, a display panel which is bonded to the supporting member by using an adhesive composed of a photocurable resin or a thermosetting resin or the like as in Patent Document 1. Even if the display panel could be detached, debris of the adhesive or remains of the display panel or the supporting member are left on each bonding surface and thus the display panel or the supporting member cannot be easily reused. Therefore, even in a case where a defect merely occurs with one of the display panel and the supporting member, it may be needed to discard or replace both of the display panel and the supporting member. It is also difficult to accurately bond the display panel at a predetermined position when the display panel is bonded to the supporting member. In addition, there is a risk that a breakage of the display panel occurs if movement or rearrangement of the display panel is repeated to position in a proper position, the display panel temporarily disposed in an inappropriate position.

Accordingly, an object of the present invention is to provide a method for attaching a display panel and a method for manufacturing a display apparatus in which the display panel can be easily attached at a predetermined position on a given plane surface or a given curved surface and thereafter the display panel can be easily detached as required from the surface on which the display panel has been attached.

Means to Solve the Problem

A method for attaching display panel according to an embodiment of the present invention is characterized by comprising: preparing a frame-shaped body comprising a first rod-like member and two second rod-like members, the two second rod-like members being substantially parallel to each other and crossing the first rod-like member; bonding the first rod-like member and the two second rod-like members to a given plane surface or a given curved surface; and moving a display panel having a width to be supported between the two second rod-like members from one of the ends of two second rod-like members towards the first rod-like member along a first surface of the two second rod-like members and a second surface of the two second rod-like members, the first surface and the second surface facing each other.

A method for manufacturing display apparatus according to another embodiment of the present invention is characterized by comprising: preparing a frame-shaped body comprising a first rod-like member and two second rod-like members, the two second rod-like members being parallel to each other and crossing the first rod-like member; bonding the first rod-like member and the two second rod-like members to a given plane surface or a given curved surface; forming a display panel having a width to be supported between the two second rod-like members; and attaching the display panel to the given plane surface or given curved surface, wherein attaching the display panel to the given plane surface or given curved surface comprising: moving the display panel from one of the ends of two second rod-like members towards the first rod-like member along a first surface of the two second rod-like members and a second surface of the two second rod-like members, the first surface and the second surface facing each other.

Effects of the Invention

According to the embodiments of the present invention, it is possible to easily attach a display panel at a proper position on a given plane surface or a given curved surface, and thereafter, it is possible to easily detach the display panel as required from the surface on which the display panel has been attached. It is also possible to obtain a display apparatus in which a display panel can be easily detached from a given plane surface or a given curved surface.

EMBODIMENT FOR CARRYING OUT THE INVENTION

Next, embodiments of a method for attaching display panel, a method for attaching display panel to vehicle windshield, and a method for manufacturing display apparatus of the present invention will be described with reference to the drawings. Materials, shapes and sizes of the constituent elements, and their relative positions or the like in the embodiments described below are merely illustrative. The method for attaching display panel, the method for attaching display panel to vehicle windshield, and the method for manufacturing display apparatus are not construed to be limitative thereto.

[Embodiment 1]

Figure 1:
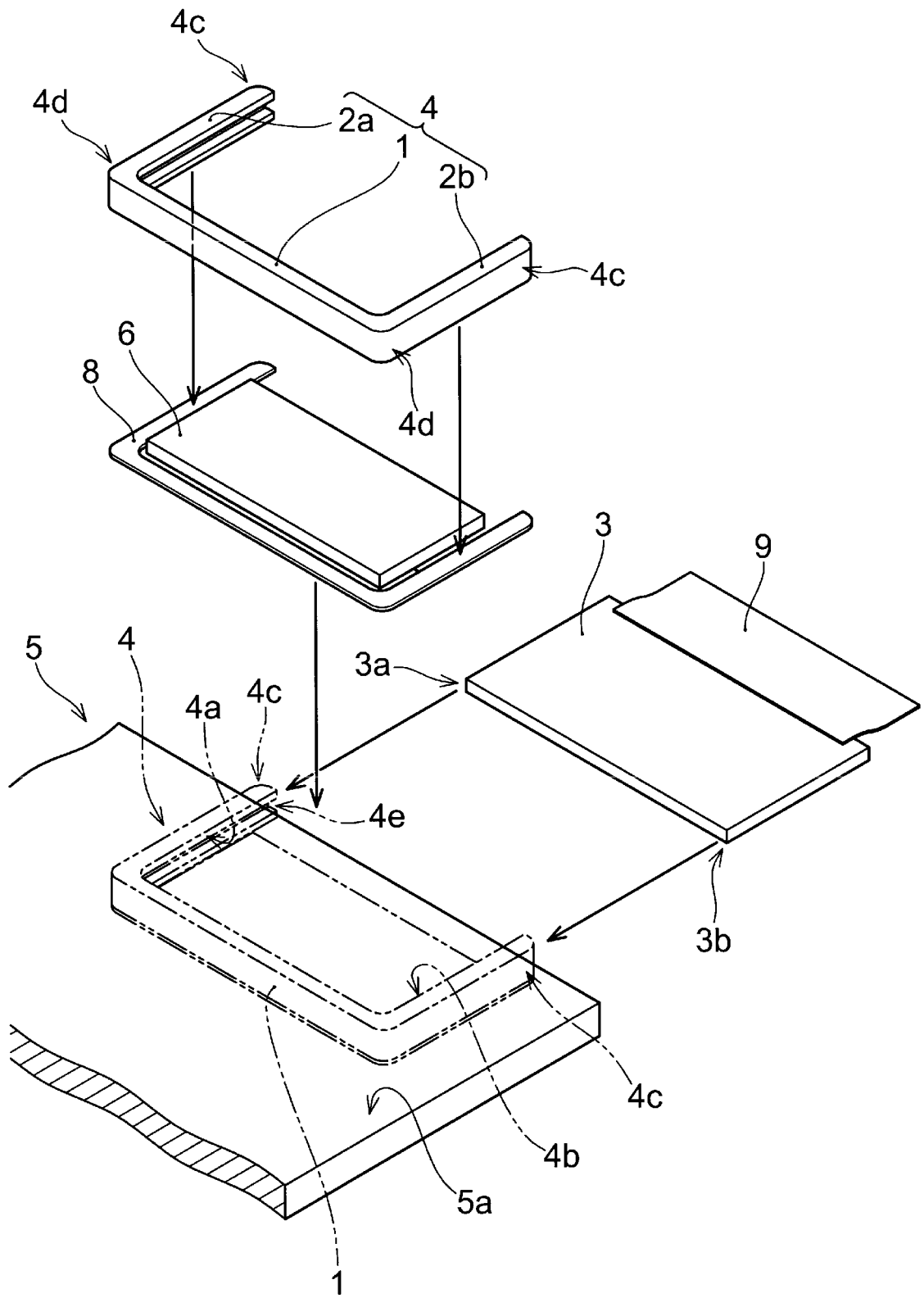
FIG. 1 schematically shows a method for attaching display panel according to Embodiment 1 of the present invention and a part of a method for manufacturing display apparatus according to another embodiment of the present invention.

In FIG. 1, an overview of a method for attaching display panel according to Embodiment 1 is shown. As shown in FIG. 1, the method for attaching display panel according to Embodiment 1 comprises: preparing a frame-shaped body 4 comprising a first rod-like member 1 and two second rod-like members 2a, 2b, the two second rod-like members being substantially parallel to each other and crossing the first rod-like member 1; and bonding the first rod-like member 1 and the two second rod-like members 2a, 2b to a given plane surface or a given curved surface (a surface 5a of an object 5 in an example in FIG. 1). The method for attaching display panel according to Embodiment 1 further comprises moving a display panel 3 having a width to be supported between the two second rod-like members 2a, 2b from first ends 4c of the two second rod-like members 2a, 2b towards the first rod-like member 1 along a first surface 4a and a second surface 4b of the two second rod-like members 2a, 2b, the first surface 4a and the second surface 4b facing each other.

Here, the expression "crossing the first rod-like member" means that at least one of an infinite number of straight lines (hereinafter, simply referred to as "straight line PL") which can be drawn between the two second rod-like members and are parallel to the second rod-like members can cross the first rod-like member. For example, in the example shown in FIG. 1 or FIG. 2A, FIG. 4B, or FIG. 5A to which reference is made in the following description, all of the straight lines PL can perpendicularly cross the first rod-like member 1. Also, in the example shown in FIG. 4A to which reference is made in the following description, most of such straight lines PL can perpendicularly cross the first rod-like member 1. In these examples shown in FIG. 1, FIG. 2A, FIG. 4A, FIG. 4B, and FIG. 5A, the two second rod-like members 2a, 2b are orthogonal to the first rod-like member 1. In addition, in the examples shown in FIG. 4C and FIG. 4D to which reference is made in the following description, substantially all of the straight lines PL can cross the first rod-like member 1 at an arbitrary crossing angle. Then, a part of such infinite number of straight lines PL can perpendicularly cross the first rod-like member 1.

The term "given plane surface or given curved surface" denotes an arbitrary surface to which the display panel 3 is to be attached in an arbitrary object to be combined with the display panel 3. In the following description, the "given plane surface or given curved surface" to which the display panel 3 is to be attached is also simply referred to as an "attaching target surface". In the examples of the drawings to which reference should be made in the following description, the surface 5a of the object 5 is the "attaching target surface" and thus reference numeral 5a is also used as a reference numeral for the "attaching target surface".

In the example in FIG. 1, second ends 4d of the two second rod-like members 2a, 2b are respectively coupled with both ends of the first rod-like member 1. A frame-shaped body 4 having a substantially square U-shaped form in front view is composed of the first rod-like member 1 and the two second rod-like members 2a, 2b. The frame-shaped body 4 opens at the first ends 4c of the second rod-like members 2a, 2b across the entire gap between the two second rod-like members 2a and 2b. In the present embodiment, the display panel 3 is led into the frame-shaped body 4 (the region surrounded in three directions by the first rod-like member 1 and the two second rod-like members 2a, 2b) through this opening of the frame-shaped body 4 and then is moved towards the first rod-like member 1.

A groove-shaped concave portion 4e is provided on the first surface 4a and the second surface 4b of the second rod-like members 2a, 2b illustrated in FIG. 1. When the display panel 3 is moved towards the first rod-like member 1, two edges (first edge 3a and second edge 3b) of the display panel 3 facing each other are inserted into the concave portions 4e of the second rod-like members 2a, 2b. And the display panel 3 is moved towards the first rod-like member 1 while the first edge 3a and the second edge 3b are respectively inserted into the concave portions 4e.

In the example in FIG. 1, a weak adhesive layer 6 is formed at a portion surrounded by the frame-shaped body 4 in the attaching target surface 5a. The weak adhesive layer 6 is formed using an adhesive agent on the attaching target surface 5a or a surface of the display panel 3 which is oriented to the attaching target surface 5a so as to bring the attaching target surface 5a and the display panel 3 into close contact with each other. FIG. 1 shows an example of a case in which the first rod-like member 1 and the two second rod-like members 2a, 2b are bonded to the attaching target surface 5a by using an adhesive agent 8. Furthermore, a wiring board 9 is also connected to the display panel 3.

In the present embodiment, the display panel 3 having a width to be supported between the two second rod-like members 2a, 2b is attached to the attaching target surface 5a. That is, the two second rod-like members 2a, 2b are bonded to the attaching target surface 5a apart from each other at an interval in which the display panel 3 can be supported. The two second rod-like members 2a, 2b are bonded at respective positions facing each other via a predetermined region at which the display panel 3 is to be attached (hereinafter, this region is also simply referred to as a "attaching target region"). Therefore, it is possible to position the display panel 3 appropriately at the attaching target region in the direction in which the two second rod-like members 2a, 2b facing each other, by only placing the display panel 3 along the first surface 4a and the second surface 4b of the two rod-like members 2a, 2b at the time of moving the display panel 3 towards the first rod-like member 1.

The first rod-like member 1 can also be bonded at a position which is determined based on the attaching target region in the attaching target surface 5a. The first rod-like member 1 is preferably bonded at a position which is determined so that while moving the display panel 3 towards the first rod-like member 1, the display panel 3 abuts against the first rod-like member 1 when the display panel 3 reaches the attaching target region or a position right above the attaching target region. By doing so, it is possible to position the display panel 3 appropriately at the attaching target region in a parallel direction to the second rod-like members 2a, 2b, by merely moving the display panel 3 until the display panel 3 abuts against the first rod-like member 1.

In other words, the frame-shaped body 4 is bonded to the attaching target surface 5a so that the attaching target region are preferably surrounded in three directions along an outer edge of the attaching target region by the first rod-like member 1 and the two second rod-like members 2a, 2b. In that case, it is possible to position the display panel 3 easily and appropriately at a predetermined attaching target region, by moving the display panel 3 along the first surface 4a and the second surface 4b of the two second rod-like members 2a, 2b until the display panel 3 abuts against the first rod-like member 1. Accordingly, it is possible to reduce repetitive operation for position adjustment of the display panel 3 or rearrangement of the display panel 3, or the like. Therefore, it is possible to lower a risk of breaking the display panel 3. When the first rod-like member 1 and the second rod-like members 2a, 2b are bonded, positioning these members is required, however, each rod-like member and the frame-shaped body 4 have a simpler structure in comparison with the display panel 3 and can be prepared at a low cost. Therefore, it is considered that even if the operation such as the position adjustment and the rearrangement are repeated at the time of the bonding, these members are unlikely to break, and even if a breakage occurs, a significant loss is not likely to occur.

Further, the display panel 3 that is attached to the attaching target surface 5a by the method for attaching display panel according to the present embodiment can be prevented from moving outward from the frame-shaped body 4 by the first rod-like member 1 and the two second rod-like members 2a, 2b. An outward movement of the display panel 3 through the opening of the frame-shaped body 4 and a movement of the display panel 3 in a direction in which the panel is separated from the attaching target surface 5a can be restricted by a frictional force that can act on a contact surface between each rod-like member and the display panel 3 or an action exerted by the weak adhesive layer 6 described above, or the like. In the example of FIG. 1 in particular, each of the first and second edges 3a, 3b of the display panel 3 is inserted into the concave portion 4e of the second rod-like member 2a, 2b, and therefore, owing to engagement between the first and second edges 3a, 3b and the concave portion 4e, movement of the display panel 3 in the direction in which the panel is separated from the attaching target surface 5a is more surely prevented. Further, in a case where the display panel 3 is used while being oriented such that the first rod-like member 1 is located at lower side, in a gravitational direction, than the first ends 4c of the two second rod-like members 2a, 2b and the opening of the frame-shaped body 4, the outward movement of the display panel 3 through the opening of the frame-shaped body 4 can be further restricted by gravity.

In this way, the display panel 3 that was attached to the attaching target surface 5a by using the attaching method of the present embodiment can be prevented from separating from the attaching target surface 5a and shifting significantly on the attaching target surface 5a during use. That is, in the present embodiment, it is not always necessary to fix the display panel 3 on the attaching target surface 5a using an adhesive agent or the like. Therefore, the display panel 3 that was attached by using the method of the present embodiment can be easily detached from the attaching target surface 5a. For example, merely by moving the display panel 3 in a direction opposite to the direction in which the display panel 3 was moved at the time of attaching, the display panel 3 and the attaching target surface 5a can be easily separated from each other. In a case where the attaching target surface 5a is a surface of a window glass, when the window glass breaks, the display panel 3 can be detached from the attaching target surface 5a and reused. Alternatively, when the display panel 3 breaks, the display panel 3 can be easily replaced with another display panel 3. That is, it is possible to avoid a situation in which both the display panel 3 and an arbitrary object 5 having the attaching target surface 5a must be discarded although a defect or malfunction has merely occurred with only either one of the display panel 3 and the arbitrary object 5.

Figure 2A:
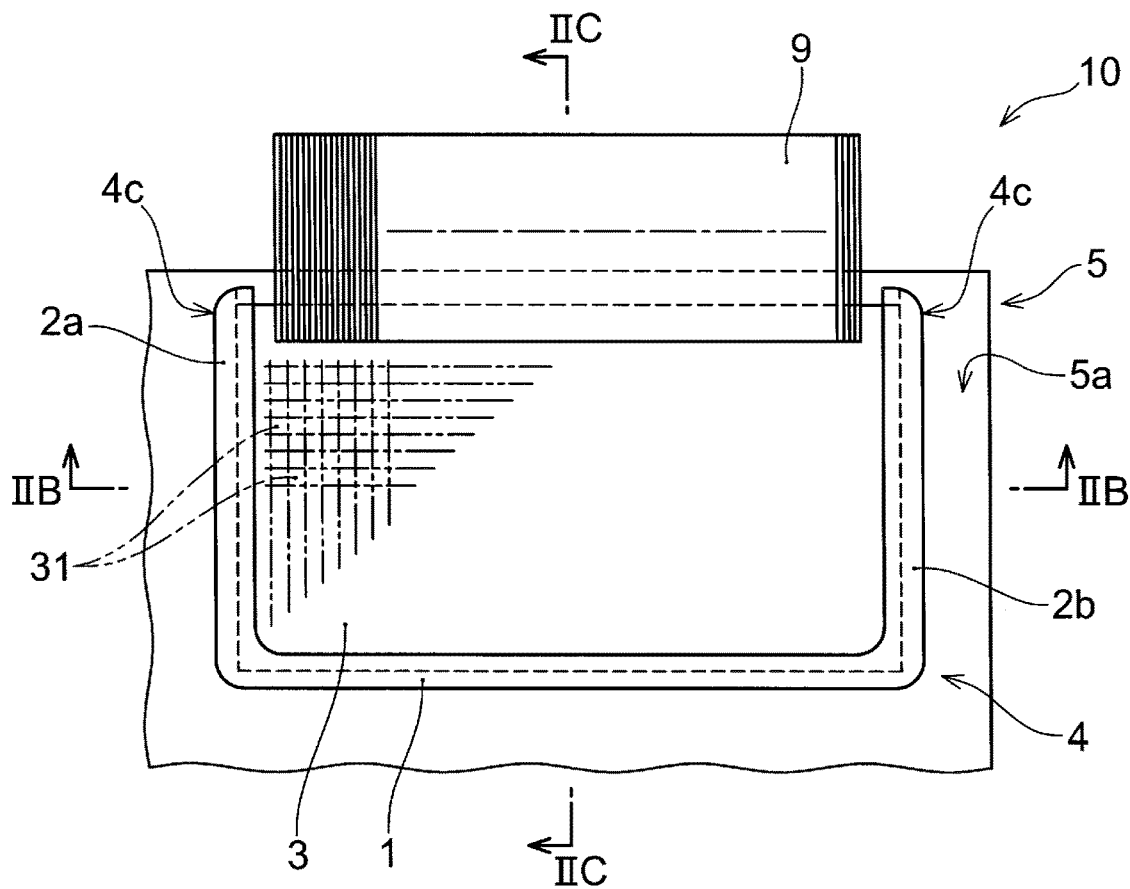
FIG. 2A shows a front view of an example of a display panel attached to an attaching target surface by using the method for attaching display panel according to Embodiment 1.
Figure 2B:
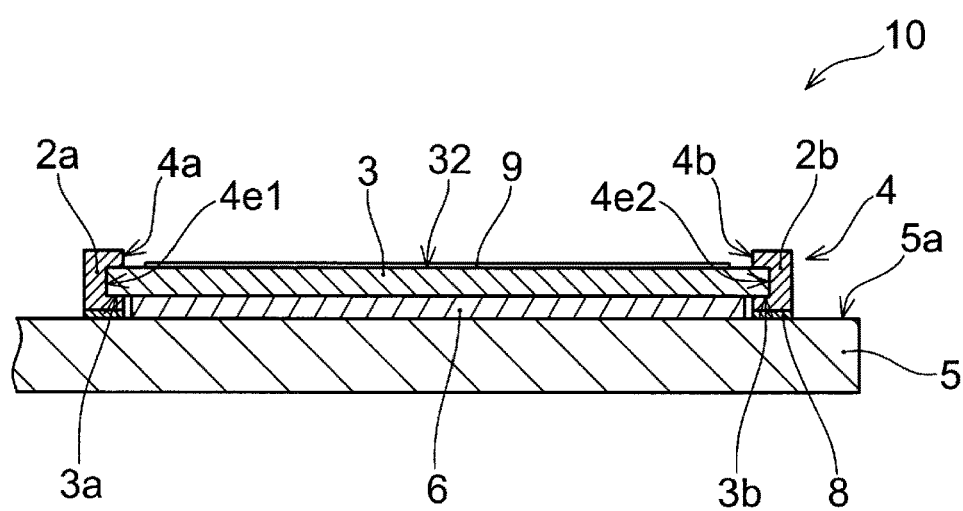
FIG. 2B shows a cross-sectional view along a line IIB-IIB of FIG. 2A.
Figure 2C:
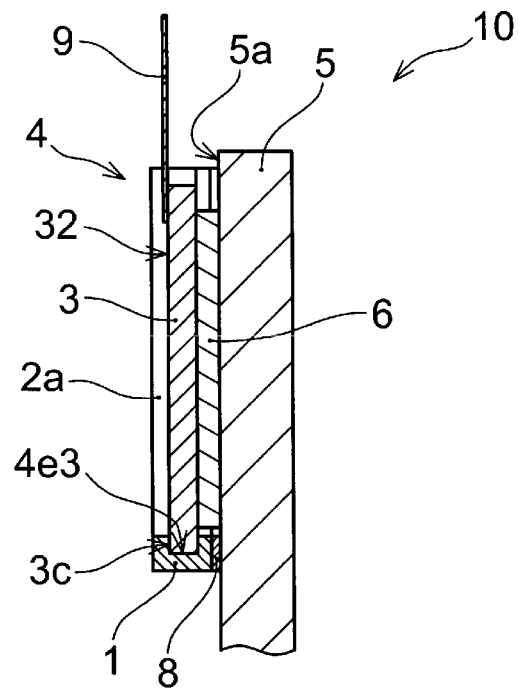
FIG. 2C shows a cross-sectional view along a line IIC-IIC of FIG. 2A.

In FIG. 2A to FIG. 2C, an example of a display panel (display panel 3) that was attached to the attaching target surface 5a by using the method for attaching display panel according to the present embodiment is shown together with the frame-shaped body 4. A display apparatus 10 including at least the display panel 3, the frame-shaped body 4 and the object 5 having the attaching target surface 5a can be manufactured by attaching the display panel 3 to the attaching target surface 5a by using the method for attaching the display panel according to the present embodiment. FIG. 2B shows a cross section along the line IIB-IIB shown in FIG. 2A, and FIG. 2C shows a cross section along the line IIC-IIC. In FIG. 2A to FIG. 2C, similar constituent elements to those shown in FIG. 1 described above are referred with the same reference numerals as those of FIG. 1. As shown in FIG. 2A to FIG. 2C, the frame-shaped body 4 having a substantially square U-shaped planar shape is bonded to the attaching target surface 5a using the adhesive 8. The frame-shaped body 4 includes: the first rod-like member 1; and the two second rod-like members 2a, 2b parallel to each other, orthogonal to the first rod-like member 1 and respectively coupled with either one of both ends of the first rod-like member 1. The frame-shaped body 4 opens throughout an edge which is opposite to the first rod-like member 1. The display panel 3 includes a plurality of pixels 31 arranged in a matrix form, and is held on the attaching target surface 5a by the frame-shaped body 4. A wiring board 9 is connected to the display panel 3.

As shown in FIG. 2B, groove-shaped concave portions 4e1, 4e2 are respectively provided on the first surface 4a and the second surface 4b, facing each other, of the second rod-like members 2a, 2b. The first edge 3a of the display panel 3, which is adjacent to the first surface 4a of the second rod-like member 2a, is inserted into the concave portion 4e1. Similarly, the second edge 3b of the display panel 3, which is adjacent to the second surface 4b of the second rod-like member 2b, is inserted into the concave portion 4e2. Also, as shown in FIG. 2C, a groove-shaped concave portion 4e3 is provided on a surface of the first rod-like member 1 facing the inside of the frame-shaped body 4. Then, a third edge 3c of the display panel 3, which is adjacent to the first rod-like member 1, is inserted into the concave portion 4e3.

The weak adhesive layer 6 is interposed between the display panel 3 and the attaching target surface 5a. The display panel 3 and the attaching target surface 5a are brought into close contact with each other, preferably in a substantially gapless state, owing to the adhesiveness that the weak adhesive layer 6 provides. Further, as shown in FIG. 2A and FIG. 2C, the wiring board 9 is drawn to outside of the frame-shaped body 4 through the opening of the frame-shaped body 4.

The first rod-like member 1 and the two second rod-like members 2a, 2b are formed of any material having rigidity and durability sufficient to serve as a guiding part for the display panel 3 when the display panel 3 is attached, and thereafter, to prevent an unintended outward movement of the display panel 3 from the frame-shaped body 4. Examples of the materials for each rod-like member, that is, the frame-shaped body 4 include, for example, a synthetic resin such as an epoxy resin or a general purpose plastics, a natural resin such as a natural rubber, and a rubber sponge. It is preferable that the frame-shaped body 4 is formed of a material with a less frictional coefficient in view of easiness for moving the display panel 3 at the time of attaching the display panel 3. For example, a fluorine resin such as PTFE, a polyacetal resin, or a polyamide resin can be used. However, in view of the function of preventing the movement of the display panel 3 in use, a silicone-based resin or a natural or synthetic rubber each having an appropriate frictional coefficient may be used as a material for the frame-shaped body 4. The frame-shaped body 4 may also be formed using a light transmissive material so as to be unlikely to be recognized by a user of the display panel 3. It is particularly useful to use the light transmissive material, in a case where the object 5 having the attaching target surface 5a is formed of the light transmissive material (such as a glass, transparent polyimide, PET or the like) and further the display panel 3 has light transmission property. In this respect, it is preferable that the frame-shaped body 4 is formed using a transparent silicone rubber, an acrylic-based resin or the like, and the frame-shaped body 4 may be formed using a glass.

Examples of the display panel 3 that is attached by using the method of the present embodiment include an organic EL display panel and a liquid crystal display panel. However, the display panel 3 is not limited to those panels. In addition, the method of the present embodiment may be used for the display panel 3 having flexibility, and may be used for the display panel 3 such as a transparent organic EL display panel, which is formed of a material having light transmission property.

The weak adhesive layer 6 is composed of an adhesive agent including, for example, acrylic-based resin, silicone-based resin, or a urethane-based resin solely or in combination of a plurality thereof as main component. The term "weak adhesive" refers to the adhesion to an extent enough to adhere to an adhesion object tightly and yet to be released easily from the adhesion object when subjected to a force in a releasing direction without causing any damage to the adhesion object or leaving any glue on the adhesion surface. By forming the weak adhesive layer 6, the display panel 3 and the attaching target surface 5a are substantially securely brought into close contact with each other. Therefore, it is possible to prevent lifting of the display panel 3 and air bubble entrapment at an interface between the display panel 3 and the attaching target surface 5a or the like. Moreover, the display panel 3 can be easily detached as required without excessive damage with the display panel 3 or the object 5.

The wiring board 9 electrically connects a driver (not shown) which supplies a drive signal to the display panel 3 and the display panel 3 to each other. Examples of the wiring board 9 include a flexible printed circuit (FPC) having a flexible film formed of a resin such as polyimide or polyethylene terephthalate and a wiring pattern formed on the flexible film using a conductor such as copper. The wiring board 9 is connected to the display panel 3 at one end of the wiring board 9. Such one end of the wiring board 9 is connected, using an anisotropic conductive film (ACF), to a connection pad (not shown) provided on a display surface 32 of the display panel 3. In place of the wiring board 9, a plurality of cables may be used and one ends of such cables may be connected to the display panel 3.

The attaching target surface 5*a*, as described above, may be a plane surface as in the examples of FIG. 2A to FIG. 2C or may be a curved surface. The object 5 having the attaching target surface 5*a* as one of surfaces thereof may be any member, any article, or any structure in which the display panel 3 can be attached on the one surface (attaching target surface 5*a*). The object 5 can be formed using any material such as a glass, a metal, and a synthetic resin or the like. In a case where the display panel 3 has flexibility, it is preferable that the object 5 have rigidity sufficient to appropriately support the display panel 3. That is, the object 5 may be an armoring member referred to, for example, case, cover, or casing and having a predetermined rigidity to impart durability against external mechanical stress to the display panel 3. In addition, on the surface (mainly the surface other than the attaching target surface 5*a*) of the object 5, a desired decoration may be applied, and the object 5 may have a shape suitable for a situation in which the display panel 3 is used. Therefore, a display apparatus provided with the display panel and the covering member and having a desired rigidity, decorativeness, and easiness of handling can be manufactured by attaching the display panel to the given plane surface or curved surface by using the method for attaching display panel according to the present embodiment. Further, the object 5 may also be any member constituting various devices, apparatuses, tools or structures other than the display panel 3 or may be a part thereof. For example, the object 5 may be a glass plate used in a household window, a show window, or an exhibition case or the like, and may be a member constituting the casings of various apparatuses or the interior or exterior walls of building.

Furthermore, the object 5 may be a vehicle windshield, and the attaching target surface 5*a* may be a surface of the vehicle windshield oriented to an interior of the vehicle. An arbitrary device or apparatus provided with a display panel can be manufactured by attaching the display panel to the given plane surface or the given curved surface by using the method for attaching display panel according to the present embodiment.

Figure 3A:
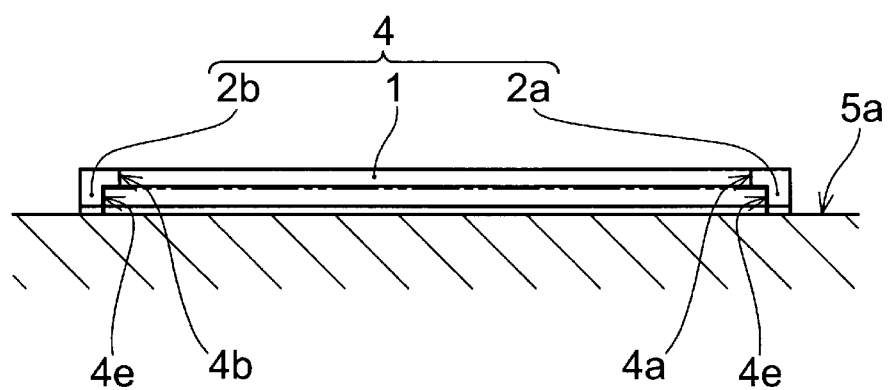
FIG. 3A shows a variation of first and second rod-like members of a frame-shaped body illustrated in FIG. 2A to FIG. 2C.
Figure 3B:
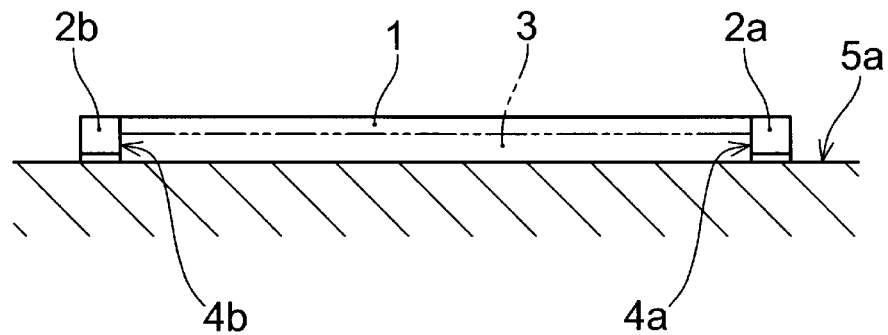
FIG. 3B shows another variation of the first and second rod-like members of the frame-shaped body exemplified in FIG. 2A to FIG. 2C.

FIG. 3A and FIG. 3B show variations of the first rod-like member 1 and the second rod-like members 2*a*, 2*b* in the frame-shaped body 4 shown in FIG. 2A to FIG. 2C. In addition, in FIG. 4A to FIG. 4D and FIG. 5A to FIG. 5D variations of the frame-shaped body 4 are shown. Each of FIG. 3A, FIG. 3B, and FIGS. 5B to 5D shows each variation of the frame-shaped body 4, together with the attaching target surface 5*a*, in such a way as to view the frame-shaped body 4 along a direction towards the first rod-like member 1 from the first ends 4*c* (refer to FIG. 2A) of the second rod-like members 2*a*, 2*b*. In each figure, the display panel 3 is appropriately drawn by the chain double-dashed line. In the method of the present embodiment, the frame-shaped body 4 of various modes as shown in the figures can be used.

In the example shown in FIG. 3A, the second rod-like members 2*a*, 2*b* each have a L-shaped cross-sectional shape, and the concave portions 4*e* are provided by a step that are formed on the first surface 4*a* and the second surface 4*b*. In the first rod-like member 1 as well, the concave portion 4*e* is provided by a step that is formed on a surface facing the inside of the frame-shaped body 4. The interior wall of the concave portion 4*e* facing the step that is provided in each rod-like member is composed of the attaching target surface 5*a*. Each edge of the display panel 3 is inserted into the concave portion 4*e*.

Therefore, a separating movement of the display panel 3 from the attaching target surface 5*a* can be prevented. Although the weak adhesive layer 6 (refer to FIG. 2B) is not shown in FIG. 3A and the FIG. 3B described below, even in a case where the frame-shaped body 4 shown in FIG. 3A and FIG. 3B is used, the weak adhesive layer 6 may be formed.

In a case where movement of the display panel 3 in the direction in which the display panel is separated from the attaching target surface 5*a* can be prevented by the frictional force between the display panel 3 and each rod-like member or the effect of the weak adhesive layer 6 (refer to FIG. 2B), the concave portion may not be provided in each rod-like member as in the example shown in FIG. 3B. That is, in the present embodiment, the first rod-like member 1 and the second rod-like members 2*a*, 2*b* that have no groove or step each of which can constitute the concave portion 4*e* (refer to FIG. 3A) can be used. In the example of FIG. 3B, both the first surface 4*a* and the second surface 4*b* of the second rod-like members 2*a*, 2*b* are flat, and therefore, no concave portion is formed. In the first rod-like member 1 as well, no concave portion is formed on the surface facing the inside of the frame-shaped body 4. Hence, in the method of the present embodiment, a concave portion may not always be provided, and the frame-shaped body 4 as shown in FIG. 3B can be used.

Figure 4A:
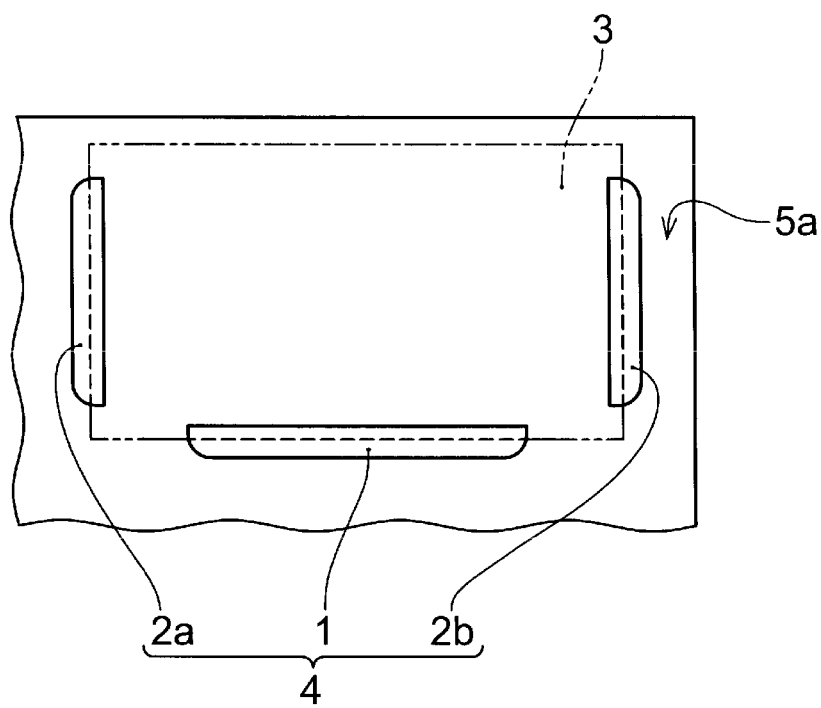
FIG. 4A shows a front view of a first variation of the frame-shaped body used in the method for attaching display panel according to Embodiment 1.

FIG. 4A shows a first variation of the frame-shaped body 4 used in the method of the present embodiment. The first rod-like member 1 and the two second rod-like members 2*a*, 2*b* which are used in the method of the present embodiment may not always be coupled with each other likely to the example of FIG. 2A. That is, as shown in FIG. 4A, there may be used the frame-shaped body 4 composed of the first rod-like member 1 and the second rod-like members 2*a*, 2*b* that are independent of each other. In the example of FIG. 4A, the first rod-like member 1 and the two second rod-like members 2*a*, 2*b* that are individually formed are bonded to the attaching target surface 5*a* while being spaced from each other. In such a frame-shaped body 4 as well, the movement of the display panel 3 in each direction can be prevented by a similar action to the action of the frame-shaped body 4 illustrated in FIG. 2A.

Figure 4B:
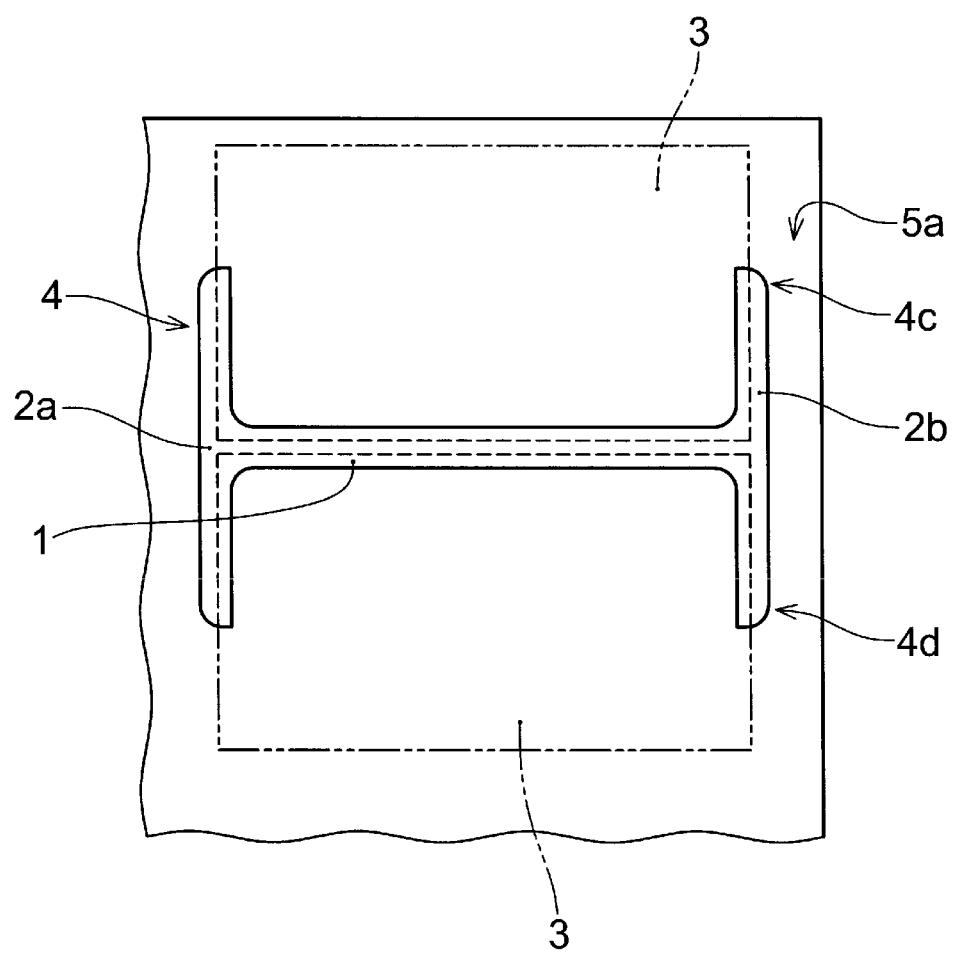
FIG. 4B shows a front view of a second variation of the frame-shaped body used in the method for attaching display panel according to Embodiment 1.

FIG. 4B shows a second variation of the frame-shaped body 4 used in the method of the present embodiment. In the example of FIG. 4B, both ends of the first rod-like member 1 are coupled with the second rod-like members 2*a*, 2*b* respectively at a substantially intermediate position in a longitudinal direction of each of the two second rod-like members 2*a*, 2*b*, and the frame-shaped body 4 having a substantially H-shaped front shape is formed. By using the frame-shaped body 4 in the example of the FIG. 4B, the display panel 3 can be easily attached to either one of or both of the two attaching target regions which are provided so as to interpose the first rod-like member 1. That is, when one display panel 3 is attached, the display panel 3 may be moved from the first ends 4*c* of the second rod-like members 2*a*, 2*b* towards the first rod-like member 1, or the display panel 3 may be moved from the second ends 4*d* towards the first rod-like member 1. In addition, when two display panels 3 are attached, one of the two display panels 3 may be moved from the first ends 4*c* towards the first rod-like member 1 and the other of the two display panels 3 may be moved from the second ends 4*d* towards the first rod-like member 1. Even in a case where the first ends 4*c* or the second ends 4*d* are located at lower side, in a gravitational direction, than the first rod-like member 1, it is considered that a separation of the display panel 3 from the attaching target surface 5*a* can be prevented by, for example, appropriate selection with respect to the weak adhesive layer 6 described above. Using the method of the present embodiment, it is also easy to detach the display panel 3 from one of the two attaching target regions and attached to another of the two attaching target regions according to a situation in use. A coupling part in the second rod-like members 2a, 2b to the first rod-like member 1 may not always be a substantially intermediate part in the longitudinal direction of the second rod-like members 2a, 2b.

Figure 4C:
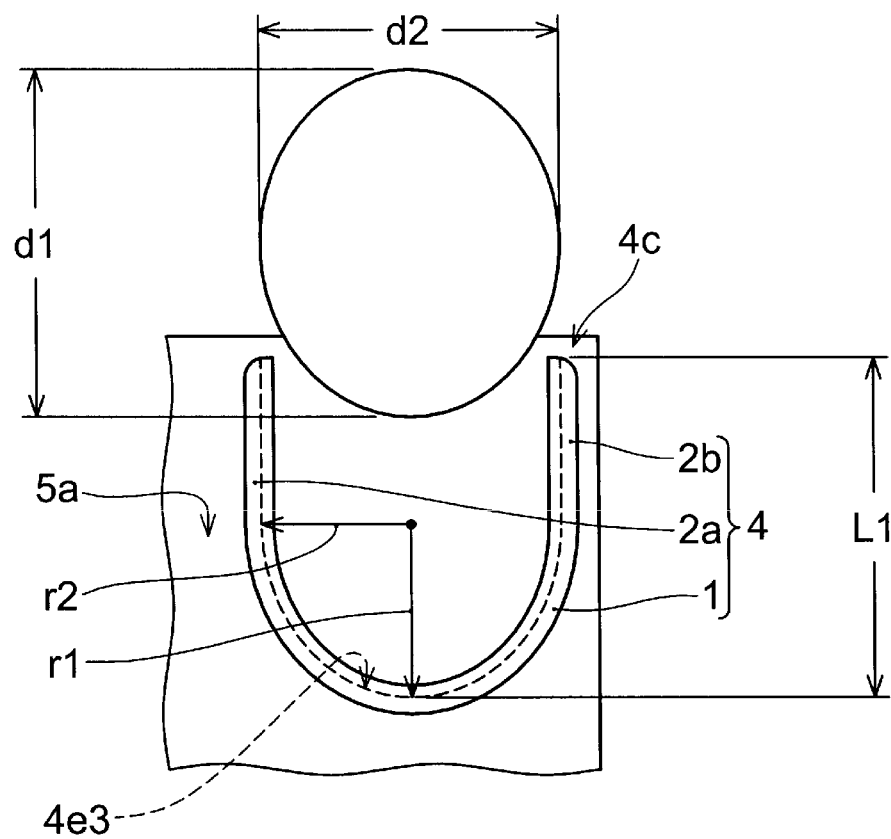
FIG. 4C shows a front view of a third variation of the frame-shaped body used in the method for attaching display panel according to Embodiment 1.

In FIG. 4C, there is shown an example of the first rod-like member 1 having a curved shape and used suitably for the display panel 3 having a curved part at an outer edge. The first rod-like member 1 curves so as to be convex along by an opposite direction to a direction facing the first ends 4c of the second rod-like members 2a, 2b, and the frame-shaped body 4 has a substantially U-shaped front shape. The first rod-like member 1 may curve in the entirety thereof as shown in FIG. 4C, alternatively, only a part of the first rod-like member 1 may curve. In the example of FIG. 4C, the front shape of the display panel 3 is an elliptical shape having a long diameter dl and a short diameter d2, and the display panel 3 is inserted into the frame-shaped body 4 in an orientation in which the long diameter dl is parallel to the second rod-like members 2a, 2b. The first rod-like member 1 curves in an elliptical arc shape so as to be along the outer edge of the display panel 3. In a case where the first rod-like member 1 curves in the elliptical arc shape, it is possible to prevent the display panel 3 from rotating about an axis which is orthogonal to the display surface of the display panel 3.

It is preferable that a curvature of the curved part of the first rod-like member 1 is substantially equal to a curvature of the outer edge of the display panel 3. Specifically, it is preferable that a curved line drawn on the attaching target surface 5a by the inmost part (the part against which the display panel 3 abuts) of the concave portion 4e3 of the first rod-like member 1 is along an arc of a semi-ellipse obtained by dividing the ellipse having the long diameter d1 and the short diameter d2 in half in a long diameter direction (radius of the longer axis of the semi-ellipse: r1=(d1)/2, radius of the shorter axis of the semi-ellipse: r2=(d2)/2). In addition, a length L1 from the inmost part of the concave portion 4e3 on a central axis of the first rod-like member 1 (the axis being parallel to the second rod-like members 2a, 2b) to an end surface of the second rod-like members 2a, 2b at the first ends 4c is preferably equal to the long diameter d1 of the display panel 3.

Figure 4D:
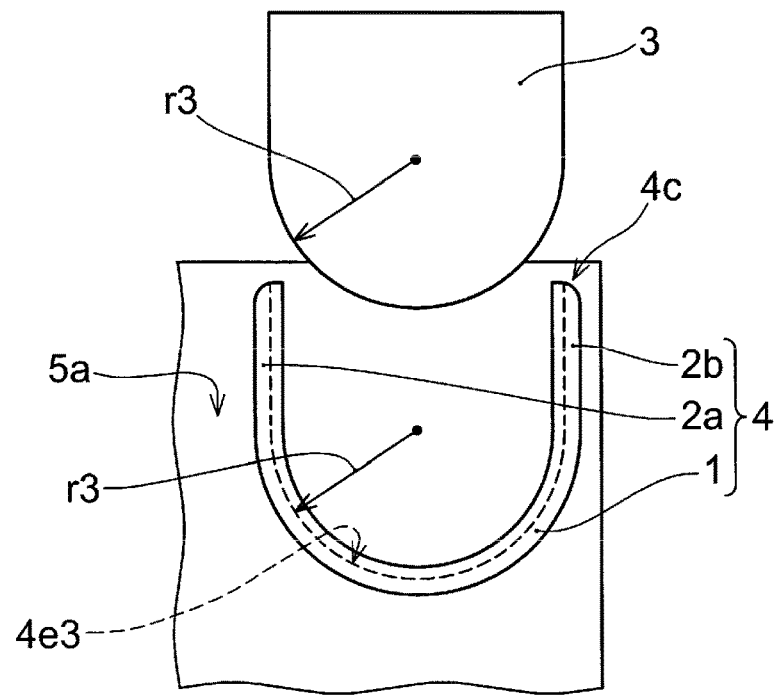
FIG. 4D shows a front view of a fourth variation of the frame-shaped body used in the method for attaching display panel according to Embodiment 1.

In a case where the first rod-like member 1 has a curved part, the curved part may not always curve so as to be along the elliptical arc. As in the example shown in FIG. 4D, the curved part may curve so as to lie along an arc of a perfect circle. An inmost part of the concave portion 4e3 of the first rod-like member 1 draws an arc of the perfect circle of radius r3 on the attaching target surface 5a. The first rod-like member 1 illustrated in FIG. 4D is used for the display panel 3 having a front shape which includes a semicircular shape of radius r3 (semicircle of the perfect circle) and a rectangular shape connected to the semicircular shape. The display panel 3 is inserted into the frame-shaped body 4 with the semicircular part at the head. Rotation about the axis which is orthogonal to the display surface of the display panel 3 can be prevented owing to abutment between the rectangular part of the display panel 3 and the second rod-like members 2a, 2b.

Figure 5A:
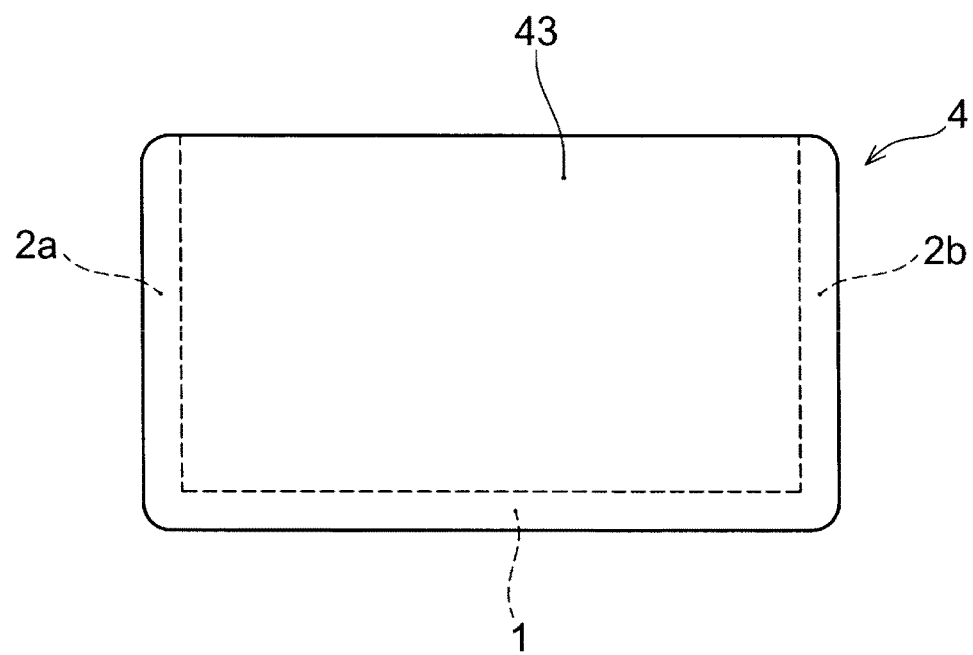
FIG. 5A shows a front view of a fifth variation of the frame-shaped body used in the method for attaching display panel according to Embodiment 1.
Figure 5B:
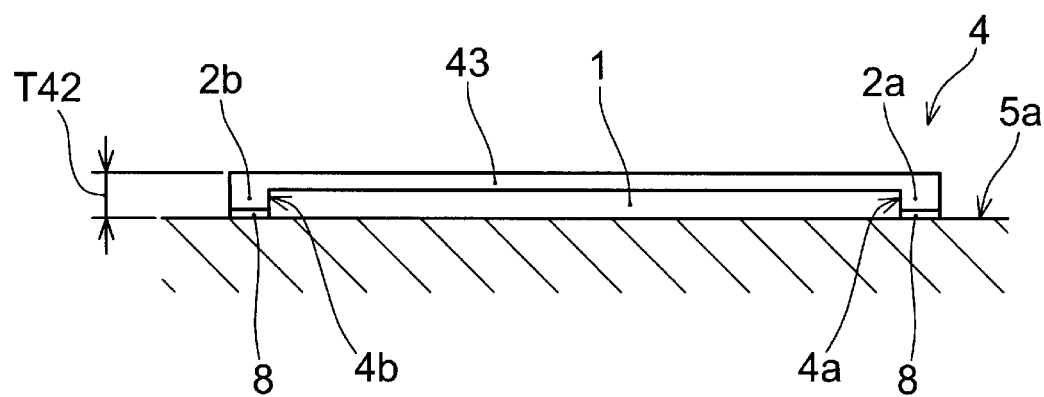
FIG. 5B shows a plan view of the frame-shaped body illustrated in FIG. 5A.

FIG. 5A and FIG. 5B show a fifth variation of the frame-shaped body 4 used in the method of the present embodiment. The frame-shaped body 4 illustrated in FIG. 5A and FIG. 5B is composed of the first rod-like member 1, the two second rod-like members 2a, 2b, and a plate-shaped member 43. The plate-shaped member 43 has: long edges having a length which is substantially equal to a length of the first rod-like member 1; and short edges having a length which is substantially equal to a length of each of the second rod-like members 2a, 2b, and has a substantially rectangular front shape. Further, the plate-shaped member 43 is coupled with the first rod-like member 1 at one of the two long edges and is coupled with the second rod-like members 2a, 2b at the two short edges. Each of the long edge and the short edges of the plate-shaped member 43 is coupled with a surface of each of the first rod-like member 1 and the second rod-like members 2a, 2b, the surface being opposite to a surface to be oriented to the attaching target surface 5a. The first rod-like member 1, the second rod-like members 2a, 2b, and the plate-shaped member 43 may be integrally formed, alternatively, the plate-shaped member 43 may be fixed, with an adhesive, to the first rod-like member 1 and the second rod-like members 2a, 2b that are bonded to the attaching target surface 5a.

As shown in FIG. 5B, the frame-shaped body 4 is bonded to the attaching target surface 5a while the surfaces opposite to the surfaces coupled with the plate-shaped member 43 in the first rod-like member 1 and the second rod-like member 2a, 2b being oriented to the attaching target surface 5a. In the method of the present embodiment using the frame-shaped body 4 in the example of FIG. 5A and FIG. 5B, the display panel 3 (refer to FIG. 2B) is inserted into a space which is surrounded by each rod-like member between the plate-shaped member 43 and the attaching target surface 5a. Therefore, a display surface 32 (refer to FIG. 2B) of the display panel 3 is covered with the plate-shaped member 43. Hence, the plate-shaped member 43 is formed using a light transmissive material. The frame-shaped body 4 may be entirely formed of the light transmissible material. The transparent silicone-based rubber, acrylic-based resin or glass or the like described previously can be used as a material for the plate-shaped member 43. The plate-shaped member 43 can also function as a protection cover of the display panel 3.

In the examples shown in FIG. 5A and FIG. 5B, the first surface 4a and the second surface 4b of the second rod-like members 2a, 2b do not have the concave portion 4e (refer to FIG. 1), and moreover, the weak adhesive layer 6 (refer to FIG. 1) is not formed. However, when the display panel 3 moves along a direction in which the display panel 3 is separated from the attaching target surface 5a, the display panel 3 abuts against the plate-shaped member 43. That is, the plate-shaped member 43 can have a function of preventing the display panel 3 from moving to separate from the attaching target surface 5a. Preferably, a total thickness T42 of a thickness of each of the second rod-like members 2a, 2b and a thickness of the adhesive 8 is made substantially equal to a thickness of the display panel 3. By doing so, a backlash in the thickness direction around the display panel 3 inside the frame-shaped body 4 can be reduced. In a case where the frame-shaped body 4 with the plate-shaped member 43 is used, the weak adhesive layer 6 may be formed. In addition, in the frame-shaped body 4 provided with the plate-shaped member 43 as well, as shown in FIG. 5C and FIG. 5D, the concave portion 4e may be provided by forming the groove or the step in the first rod-like member 1 and the second rod-like members 2a, 2b.

Figure 5C:
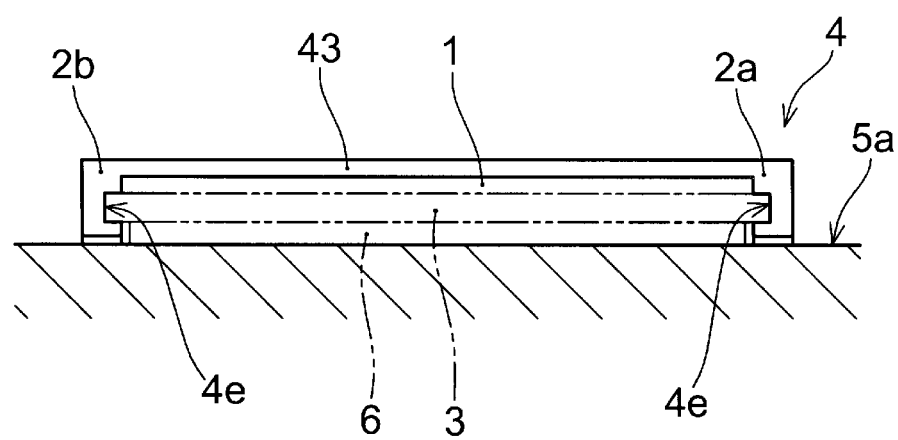
FIG. 5C shows a first variation of the first and second rod-like members of the frame-shaped body illustrated in FIG. 5A.

In the example of FIG. 5C, as with the example of FIG. 2B described above, groove-shaped concave portion 4e is provided on the second rod-like members 2a, 2b themselves.

Figure 5D:
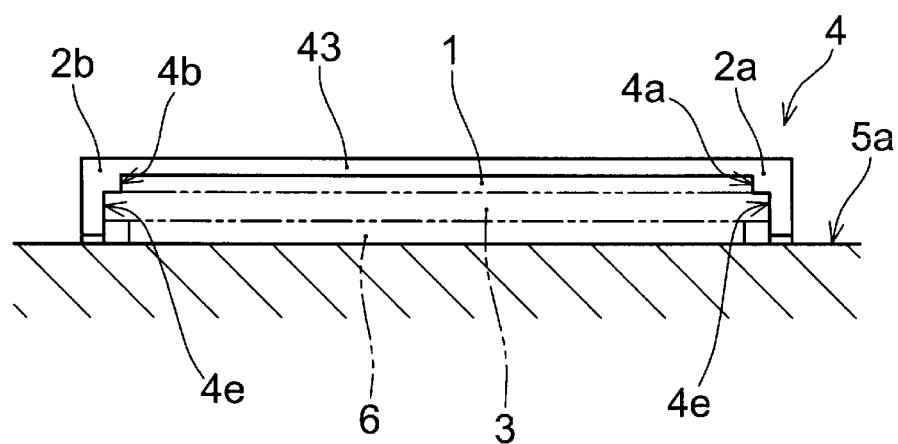
FIG. 5D shows a second example of the first and second rod-like members of the frame-shaped body illustrated in FIG. 5A.

Also, in the example of FIG. 5D, as with the example of FIG. 3A described above, the concave portion 4e is provided by forming the step on the first surface 4a and the second surface 4b of the second rod-like members 2a, 2b. Further, FIG. 5C and FIG. 5D show examples in which the weak adhesive layer 6 is formed. Thus, even in a case where the frame-shaped body 4 provided with the plate-shaped member 43 capable of covering the display panel 3 is used, the concave portion 4e may be provided in each rod-like member, and the weak adhesive layer 6 may be formed.

Next, referring to FIG. 6A to FIG. 6D, the steps in the method for attaching display panel according to Embodiment 1 will be described in order. In FIG. 6A to FIG. 6D, similar constituent elements to those shown in FIG. 1 and FIG. 2A to FIG. 2C described above are referred with same reference numerals as those of FIG. 1 or the like, and a duplicate description thereof is appropriately omitted.

Figure 6A:
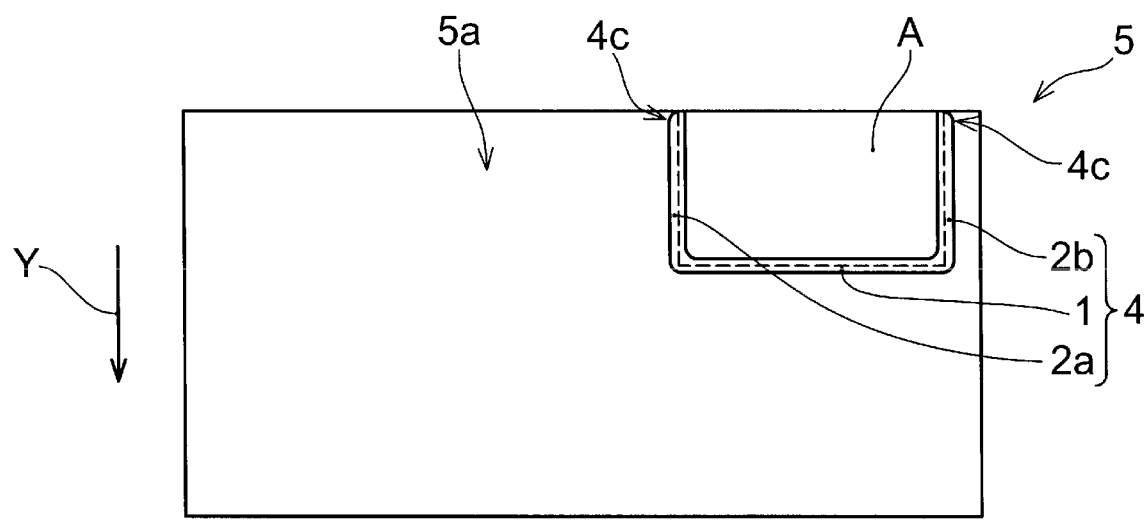
FIG. 6A shows an example of a state in which the frame-shaped body is bonded to an attaching target surface in the method for attaching display panel according to Embodiment 1.

As shown in FIG. 6A, the frame-shaped body 4 comprising the first rod-like member 1 and the two second rod-like members 2a, 2b is prepared and is bonded to the attaching target surface 5a. The two second rod-like members 2a, 2b are substantially parallel to each other and cross the first rod-like member 1. Any of the examples shown in FIG. 2A to FIG. 2C, FIG. 3A, FIG. 3B, FIG. 4A to FIG. 4D, and FIG. 5A to FIG. 5D described above may be prepared as the frame-shaped body 4. In addition, modification may be further applied to the frame-shaped body 4 which appropriately includes the first rod-like member 1 and the second rod-like members 2a, 2b, and such frame-shaped body 4 may be used. In FIG. 6A to FIG. 6D (and FIG. 8, FIG. 9, and FIG. 10A to FIG. 10C which will be described below), the frame-shaped body 4 shown in FIG. 2A to FIG. 2C is shown as an example.

The frame-shaped body 4 is positioned so as to surround a attaching target region A at which the display panel 3 (refer to FIG. 6B) is to be attached on the attaching target surface 5a, and then, the frame-shaped body 4 is bonded at the position. That is, the first rod-like member 1 and the second rod-like members 2a, 2b are respectively positioned so as to be along the edge of the attaching target region A. For example, in a case where the attaching target region A has rectangular shape (that is, the front shape of the display panel 3 is rectangular), the first rod-like member 1 is positioned outside of the attaching target region A and along a one edge of the attaching target region A. Each of the two second rod-like members 2a, 2b is positioned outside the attaching target region A and along a one of two edges of the attaching target region A, the two edges being orthogonal to the one edge described above. It can be appreciated that the display panel 3 can be attached at any position on the attaching target surface 5a that is one surface of the object 5. Therefore, the frame-shaped body 4 can also be bonded at any position on the attaching target surface 5a.

In the example of FIG. 6A, the frame-shaped body 4 is bonded in an orientation in which the frame-shaped body 4 opens at the outer edge of the attaching target surface 5a, that is, in an orientation in which the first ends 4c of the second rod-like members 2a, 2b are adjacent to the outer edge of the attaching target surface 5a.

When the opening of the frame-shaped body 4 is positioned in the vicinity of the outer edge of the attaching target surface 5a, there is a case where the display panel 3 (refer to FIG. 6B) is easily moved from the first ends 4c of the second rod-like members 2a, 2b towards the first rod-like member 1.

The object 5 is directed in any orientation relative to the gravitational direction during use of the display panel 3. For example, the object 5 is placed in an orientation in which gravitational acts along a direction indicated by the arrow Y in the example of FIG. 6A. In that case, it may be preferable that as shown in FIG. 6A, during use of the display panel 3, the first rod-like member 1 is bonded at a position which is to be lower in the gravitational direction than the first ends 4c of the two second rod-like members 2a, 2b on the attaching target surface 5a. This is because movement of the display panel 3 outward of the frame-shaped body 4 through the opening of the frame-shaped body 4 is restricted by gravity.

The frame-shaped body 4 is bonded to the attaching target surface 5a, for example, by using the adhesive 8 (refer to FIG. 2B), as described above although means for bonding the frame-shaped body 4 to the attaching target surface 5a is not particularly limited. If necessary, heating processing is performed for curing of the adhesive 8. The adhesive 8 may be applied to either one of or both of the attaching target surface 5a and a bonding surface of the frame-shaped body 4 with the attaching target surface 5a, or the adhesive 8 may be placed between the frame-shaped body 4 and the attaching target surface 5a after being molded into a form of a frame-like sheet (refer to FIG. 1).

The adhesive 8 used to bond the frame-shaped body 4 is not particularly limited as long as it is possible to develop the bonding strength capable of stably bonding the frame-shaped body 4 to the attaching target surface 5a. An arbitrary epoxy adhesive or acrylic adhesive can be used as the adhesive 8. Preferably, a light transmissive adhesive 8 is used to bond the frame-shaped body 4. As described above, in a case where the frame-shaped body 4 is formed using a light transmissive material, it is particularly preferable to use the light transmissive adhesive 8. For example, any adhesive which is called Optical Clear Adhesive (OCA) or Optical Clear Resin (OCR) such as a film-like or paste-like acrylic-based, silicone-based or urethane-based adhesive can be used as the adhesive 8. The bonding strength between the frame-shaped body 4 and the attaching target surface 5a that is obtained by the adhesive 8 is larger than 5.0 N/10 mm and is 10 N/10 mm or less, for example.

Figure 6B:
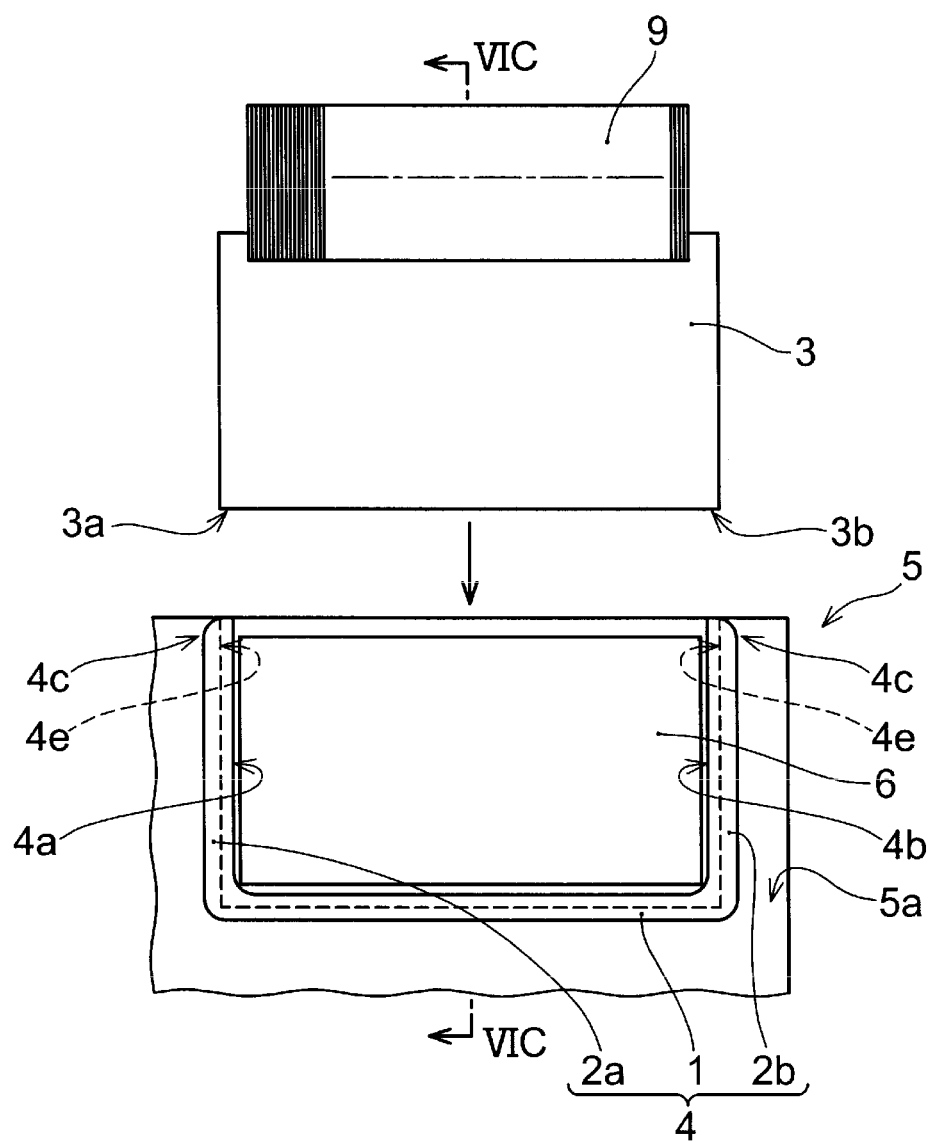
FIG. 6B shows an example of a step in which the display panel is moved towards the first rod-like member in the method for attaching display panel according to Embodiment 1.
Figure 6C:
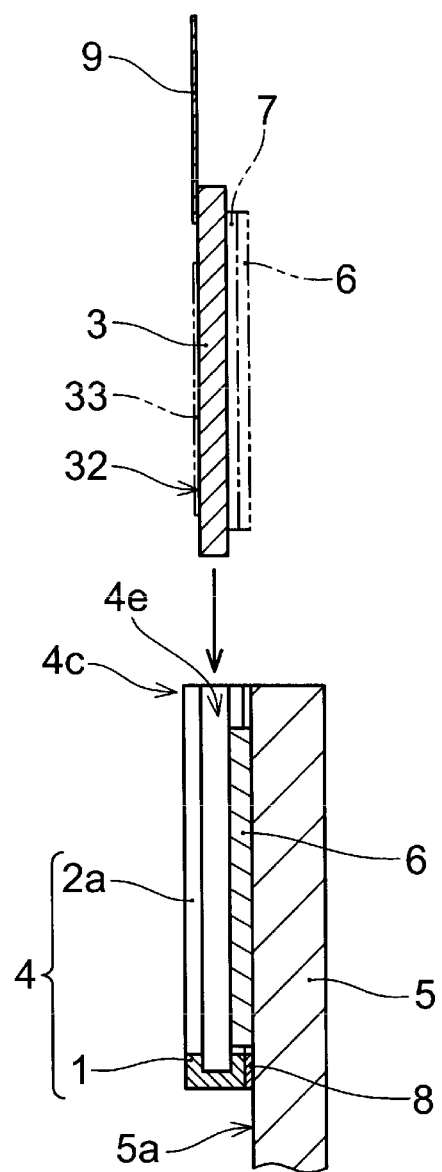
FIG. 6C shows a cross-sectional view along a line VIC-VIC of FIG. 6B.

Next, as shown in FIG. 6B and FIG. 6C, the display panel 3 is led into the frame-shaped body 4 from the first ends 4c of the two second rod-like members 2a, 2b and further moved towards the first rod-like member 1. Prior to this step, preferably, the weak adhesive layer 6 is formed using the adhesive agent on the attaching target surface 5a. The weak adhesive layer 6 may be formed, not on the attaching target surface 5a, but on a surface of the display panel 3 which is oriented to the attaching target surface 5a as indicated by the chain double-dashed line in FIG. 6C. The weak adhesive layer 6 is formed by disposing a weak adhesive sheet, formed by molding, for example, adhesive agent into a predetermined shape, on the attaching target surface 5a or on the surface of the display panel 3 which is oriented to the attaching target surface 5a.

The adhesive agent constituting the weak adhesive layer 6, as described above, can include acrylic-based, silicone-based, or urethane-based resin as main component. The acrylic resin has superior weather resistance and heat resistance and further has superior transparency. In a case where the display panel 3 is a transparent organic EL display panel and the display panel 3 is attached to any transparent object 5, the weak adhesive layer 6 having high transparency is preferred in that the light transmission property is hardly influenced. The silicone-based resin also has superior weather resistance and transparency and further has particularly superior heat resistance and hardly turns to yellow and thus is preferred as a material for the weak adhesive layer 6.

In addition, the weak adhesive layer 6 is preferably formed using an adhesive agent which does not have adhesiveness under a normal pressure but develops adhesiveness by being pressurized.

Here, the expression "does not have adhesiveness" means that in a state where an exposed surface of the weak adhesive layer 6 formed on the attaching target surface 5*a* or on the display panel 3 and the object around the exposed surface come into contact with each other, the weak adhesive layer 6 does not have any adhesiveness to such an extent that a slide relative to the object is hindered. If the weak adhesive layer 6 is formed in that way, when the display panel 3 is moved towards the first rod-like member 1, even in a case where the weak adhesive layer 6 and the display panel 3 (the attaching target surface 5*a* in a case where the weak adhesive layer 6 is formed on the display panel 3) come into contact with each other, the display panel 3 can be moved smoothly without any problem. Then, by pressing the display panel 3 towards the attaching target surface 5*a* after the display panel 3 has been moved as described below, it is possible to cause the weak adhesive layer 6 to develop the adhesiveness and to bring the weak adhesive layer 6 into close contact with the display panel 3. A general pressure sensitive adhesive agent can be used for the adhesive agent which develops the adhesiveness by applying pressure. For example, a double-sided adhesive tape provided with a weak adhesive film formed of a pressure sensitive adhesive agent is used as the weak adhesive layer 6.

An adhesion strength between the weak adhesive layer 6 and either one of or both of the display panel 3 and the attaching target surface 5*a* is, for example, 0.02 N/10 mm or more and 5.0 N/10 mm or less, and is preferably 1.5 N/10 mm or more and 2.0 N/10 mm or less. If the adhesion strength of this range is obtained, it is considered that the possibility that the display panel 3 is unintentionally separated from the attaching target surface 5*a* is low. In addition, it is considered that when detaching the display panel 3 intentionally from the attaching target surface 5*a*, the display panel 3 and the attaching target surface 5*a* can be easily separated from each other merely by pulling the display panel 3 with an appropriate force.

Further, the method for attaching display panel according to the present embodiment, as shown in FIG. 6C, may further comprise providing the strong adhesive layer 7 having an adhesive force equal to or more than the adhesive force of the weak adhesive layer 6 between the weak adhesive layer 6 and the display panel 3 in addition to formation of the weak adhesive layer 6. In a case where the weak adhesive layer 6 is formed on the attaching target surface 5*a*, the strong adhesive layer 7 can be formed between the weak adhesive layer 6 and the attaching target surface 5*a*. The strong adhesive layer 7 can closely contact with the display panel 3 or the attaching target surface 5*a* at a stronger strength than the adhesion strength between the weak adhesive layer 6 and the attaching target surface 5*a* or the display panel 3. In addition, the strong adhesive layer 7 and the weak adhesive layer 6 are bonded to each other at a stronger strength than at least the adhesion strength between the weak adhesive layer 6 and the attaching target surface 5*a* or the display panel 3. If the strong adhesive layer 7 bonded to the weak adhesive layer 6 in this manner is formed, the display panel 3 can be detached from the attaching target surface 5*a* in a state that the weak adhesive layer 6 remains on either desired one of the display panel 3 and the attaching target surface 5*a*. Consequently, the work of detaching or replacing the display panel 3 may become easy.

Each of the adhesion strength between a strong adhesive layer 7 and the display panel 3 and the adhesion strength between the strong adhesive layer 7 and the attaching target surface 5*a* is, for example, 2.5 N/10 mm or more and 20 N/10 mm or less, and is preferably 5.0 N/10 mm or more and 20 N/10 mm or less. If such adhesion strength is obtained, the display panel 3 can be detached in a state that the weak adhesive layer 6 is securely adhered to a desired element (display panel 3 or attaching target surface 5*a*). The strong adhesive layer 7 can also be formed using a material which can include acrylic-based resin, silicone-based resin, or urethane-based resin as main component. In addition, the weak adhesive layer 6 and the strong adhesive layer 7 may be laminated via a film-like material formed using polyethylene terephthalate or the like.

Examples of the display panel 3 to be attached by using the method for attaching display panel according to the present embodiment include, as described above, an organic EL display panel and a liquid crystal display panel or the like, however, the display panel 3 is not limited to those panels. The wiring board 9 is connected to the display panel 3 by, for example, thermocompression bonding using the ACF as described above. The wiring board 9 and the display panel 3 may be connected to each other using a connector (not shown).

In the method of the present embodiment, no adhesive or the like is used to fix the display panel 3 to the attaching target surface 5*a* and thus it is preferable that permeation of moisture to an interface between the display panel 3 and the attaching target surface 5*a* is surely prevented in view of maintaining the state of close contact therebetween. Therefore, in order to prevent entry of moisture into the display panel 3, prior to attaching of the display panel 3 to the attaching target surface 5*a*, a barrier layer 33 (refer to FIG. 6C) may be formed using a moisture impermeable material on the display surface 32. Examples of the moisture impermeable material include silicon nitride, silicon oxide, and silicon nitride oxide or the like. One of a silicon nitride layer, a silicon oxide layer, and a silicon nitride oxide layer may be formed as the barrier layer 33, alternatively, two or more of these layers may be formed in a laminated form. Further, in addition to these layers formed using an inorganic material, a barrier layer 33 including an organic layer formed using, for example, an epoxy resin or an acrylic resin may be formed. The layer such as a silicon nitride layer formed using an inorganic material can be formed by using PECVD or sputtering or the like. The organic layer can be formed using a printing technique using an inkjet printer.

Subsequently, the display panel 3 is inserted between the two second rod-like members 2*a*, 2*b* from the first ends 4*c* of the two second rod-like members 2*a*, 2*b*. In the examples of FIG. 6A to FIG. 6D, the first edge 3*a* and the second edge 3*b* of the display panel 3 are respectively inserted into the concave portion 4*e* from the first ends 4*c* of the second rod-like member 2*a*, 2*b*. Subsequently, the display panel 3 is moved to the first rod-like member 1 along the first surface 4*a* and the second surface 4*b* of the two second rod-like members 2*a*, 2*b* while the first edge 3*a* and the second edge 3*b* are respectively inserted into the concave portion 4*e*. The display panel 3 is moved until the display panel 3 reaches a predetermined attaching target region. The display panel 3 is preferably moved until the display panel 3 abuts against the first rod-like member 1, then, the step of moving the display panel 3 completes.

Figure 6D:
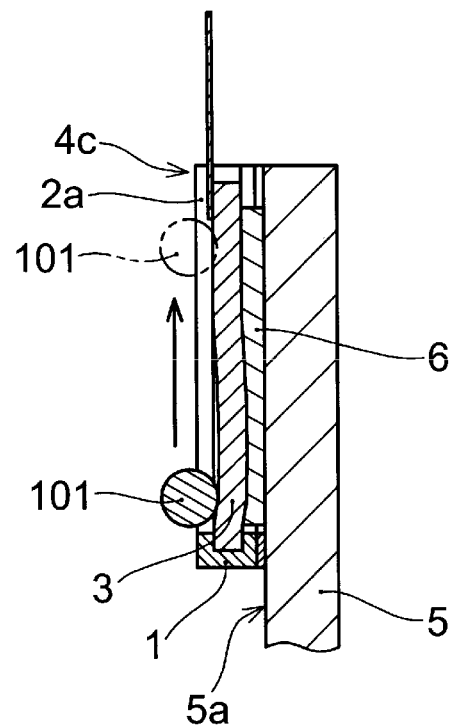
FIG. 6D shows an example of a step in which the display panel is pressed in the method for attaching display panel according to Embodiment 1.

Concurrently with the completion of moving the display panel 3, attaching the display panel 3 by the method of attaching display panel according to the present embodiment can be completed. However, after the completion of the step of moving the display panel 3, the method of the present embodiment may further comprise pressing the display panel 3 against the attaching target surface 5*a* as shown in FIG. 6D, so that the display panel 3 and the attaching target surface 5*a* closely contact with each other via the weak adhesive layer 6. In a case where the weak adhesive layer 6 and the display panel 3 or the attaching target surface 5*a* do not contact with each other after the completion of moving the display panel 3, it is preferable to carry out such a step of pressing the display panel 3. In addition, as described above, in a case where the weak adhesive layer 6 is formed using an adhesive agent that develops adhesiveness by applying pressure, the display panel 3 and the attaching target surface 5*a* can be brought into close contact with each other via the weak adhesive layer 6 by carrying out such a step of pressing the display panel 3.

FIG. 6D shows an example of a case in which the display panel 3 is pressed with a pressing member 101. The pressing member 101 may be moved from the vicinity of the first rod-like member 1 towards the first ends 4*c* of the two second rod-like members 2*a*, 2*b* (refer to FIG. 6B) when the display panel 3 is pressed towards the attaching target surface 5*a*. That is, a position of the display panel 3 to be pressed at the time of pressing the display panel 3 may be shifted from the vicinity of the first rod-like member 1 towards the first ends 4*c* of the two second rod-like members 2*a*, 2*b*. By pressing the display panel 3 in this way, it is possible to discharge the air, through the opening of the frame-shaped body 4 to the outside thereof, which may be air bubbles in the interface between the weak adhesive layer 6 and the display panel 3 or the attaching target surface 5*a*. Consequently, it is possible to almost surely bring the weak adhesive layer 6 into close contact with the display panel 3 or the attaching target surface 5*a*. The pressing member 101 is not particularly limited as long as it is possible to apply a pressure to the display panel 3. In a case where the pressing member 101 is moved, a member capable of rolling such as a roller is preferable for the pressing member 101 from a viewpoint of reduction of a stress applied to the display panel 3. Preferably, after the step of pressing the display panel 3 as shown in FIG. 6D, the work for attaching the display panel 3 by using the method for attaching display panel according to the present embodiment is completed.

In a case where the frame-shaped body 4 illustrated in FIG. 5A to FIG. 5D described above is used, the plate-shaped member 43 may be provided on the first rod-like member 1 and the second rod-like members 2*a*, 2*b* after the display panel 3 has been attached. That is, at first, the first rod-like member 1 and the two second rod-like members 2*a*, 2*b* illustrated in FIG. 2A to FIG. 2C, FIG. 3A and FIG. 3B are bonded to the attaching target surface 5*a*. Then, after the step of pressing the display panel 3 described above has been completed, the plate-shaped member 43 may be bonded to the first rod-like member 1 and the second rod-like members 2*a*, 2*b*.

Figure 7:
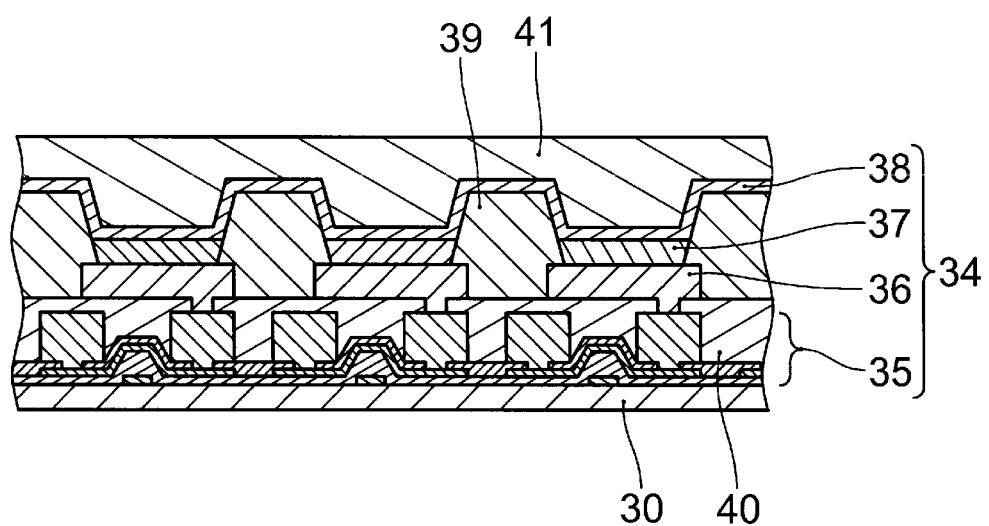
FIG. 7 shows a cross-sectional view of an example of the display panel to be attached using the method for attaching display panel according to Embodiment 1.

A method for manufacturing display apparatus of another embodiment according to the present invention comprises forming the display panel 3 having a width to be supported between the two second rod-like members 2*a*, 2*b* in addition to the steps comprised in the method for attaching display panel of Embodiment 1 described referring to FIG. 6A to FIG. 6D. An example of a method for forming the display panel 3 will be described referring to FIG. 7 which shows, in an enlarged manner, an example of a structure of an organic EL display panel used as the display panel 3. As shown in FIG. 7, the display panel 3 comprises a substrate 30 and a plurality of display elements 34 formed on the substrate 30. Examples of the substrate 30 include a resin film formed using a polyimide resin and a glass plate. A plurality of organic EL display elements (display elements 34) are formed in a matrix form on the flexible substrate 30 formed by, for example, a slot die coating technique using a polyimide resin or the like. Each display element 34 has: a TFT (thin film transistor) 35; a first electrode 36 connected to the TFT 35; an organic layer 37 to emit light formed of an organic material vapor-deposited on the first electrode 36; and a second electrode 38 formed on the organic layer 37. Each display element 34 is separated from other display elements 34 by a bank formed using insulation resin, $SiO_2$ or the like. The first electrode 36 and the bank 39 are formed on a flattening layer 40 that covers the TFT 35.

The TFT 35 can be formed by forming a channel layer composed of polycrystalline silicon or the like, an insulation layer, and each electrode, which are formed through, for example, a step of forming a film by sputtering or the like, steps of exposure and development for photoresist, and a step of patterning by etching. Alternatively, a transparent amorphous oxide semiconductor such as an oxide of indium, gallium, and zinc may be used for the channel layer. The first electrode 36 is formed by forming a film and patterning using a conductive material having light transmission property such as an ITO layer. Then, the bank 39 is formed by forming a resin layer and patterning the resin layer, and within each division surrounded by the bank 39, the organic layer 37 is formed using a vacuum vapor deposition technique using a mask, or an inkjet technique or the like. Although the organic layer 37 is shown as a single layer in FIG. 7, actually, a hole injection layer, a hole transport layer, a light emitting layer, an electron transport layer, and an electron injection layer or the like are formed in order by the vacuum vapor deposition technique or the like so that the organic layer 37 having a multilayered structure is formed. Each layer of the organic layer 37 can be formed using a known material. Then, the second electrode 38 is formed to be sufficiently thinner than a light wavelength so as to have transparency by using a technique such as vacuum vaper deposition. The second electrode 38 is formed using, for example, a metal with a small work function such as an Mg—Ag alloy layer or aluminum or an alkaline metal or an alkaline earth metal. Further, on a surface of the second electrode 38, a protection layer 41 made of, for example, $Si_3N_4$ is formed. The barrier layer 33 (refer to FIG. 6C) described above may be formed as the protection layer 41. The cross-sectional structure shown in FIG. 7 is provided as a mere example, and the structure of the organic EL display panel constituting the display panel 3 and materials for each constituent element and forming method for the constituent element are not limited to the structures, the materials, and the forming method described herein.

It can be appreciated that in a case where the display panel 3 is the liquid crystal display panel (not shown), the display panel 3 includes: a first substrate formed using a very thin glass plate or the like; a second substrate having flexibility, which is disposed to be spaced from the first substrate; and a liquid crystal layer between the first and second substrates. The display panel 3 is provided with: a TFT formed on the first substrate; a pixel electrode connected to this TFT; and a first alignment film formed on the pixel electrode. In addition, the display panel 3 may be provided with: a color filter, a common electrode, and a second alignment film, all of which are provided in order on the second substrate. The liquid crystal layer is composed of a liquid crystal material filled between the first and second alignment films. A polarization film is provided on each of respective surfaces of the first substrate and the second substrate, which are opposite to the surfaces facing the liquid crystal layer. In a case where a liquid crystal display panel is formed as the display panel 3, each electrode, alignment films, polarization films, and liquid crystal layer which constitute the liquid crystal display panel can be formed by any method including a well-known method. Therefore, a detailed description thereof is omitted.

A plurality of display panel 3 composed of the organic EL display panel or the liquid crystal display panel is preferably formed simultaneously by using a substrate (for example, substrate 30) having a size of which a plurality of display panels 3 can be arrayed. Further, after each constituent element of the display panel 3 has been formed, the plurality of display panels 3 which was formed in a state of being coupled on the plurality of substrates is divided into individual display panels 3 each having a width to be supported between the two second rod-like members 2a and 2b (refer to FIG. 6B). For example, the display panel 3 can be formed through such steps.

Figure 8:
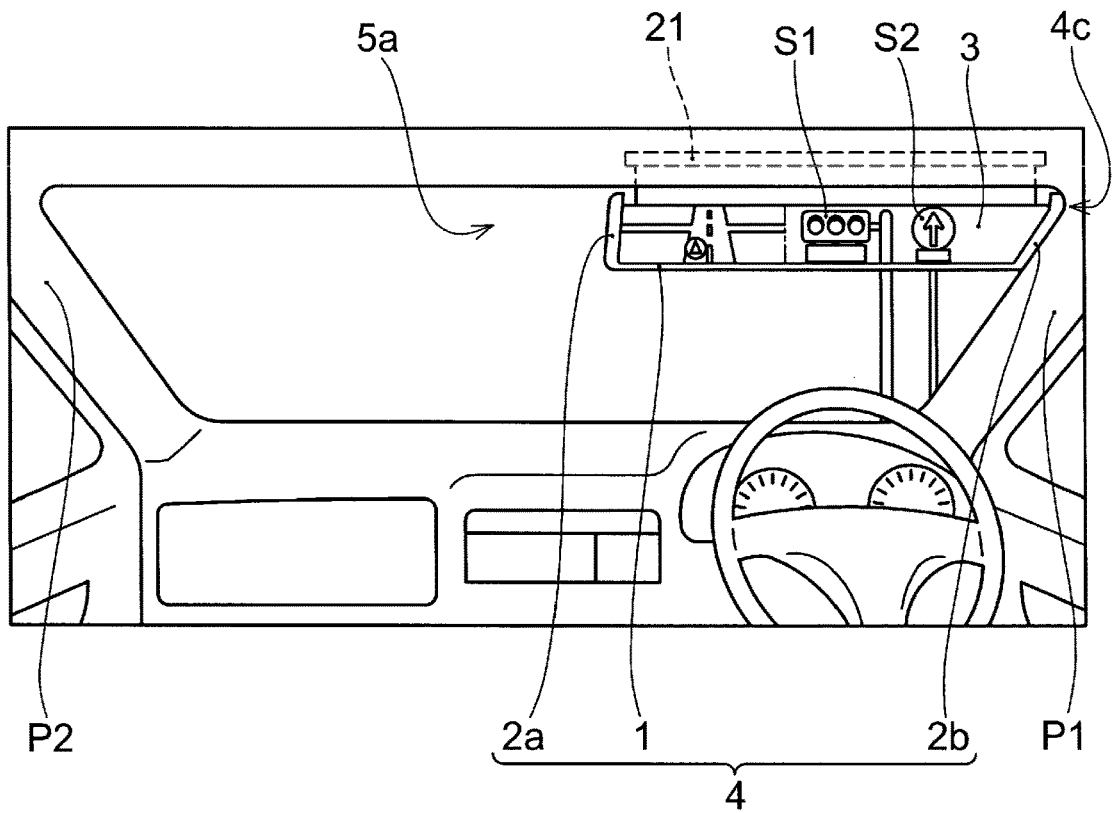
FIG. 8 shows an example of the display panel which has been attached to a vehicle windshield by using the method for attaching display panel according to Embodiment 1.

FIG. 8 shows an example of the display panel 3 attached to a vehicle windshield by the method for attaching display panel according to Embodiment 1. In the example of FIG. 8, the display panel 3 is attached to the vehicle windshield having the attaching target surface 5a as a surface facing an interior of the vehicle by using the method for attaching display panel of the present embodiment. That is, the frame-shaped body 4 composed of the first rod-like member 1 and the two second rod-like members 2a, 2b is bonded to the attaching target surface 5a (the surface of the vehicle windshield facing the interior of the vehicle), and the display panel 3 is held by the frame-shaped body 4. In addition, the display panel 3 in the example of FIG. 8 is a transparent organic EL display panel formed using a light transmissive material, and in a right side region of the display panel 3, light emission in pixel 31 (refer to FIG. 2A) is stopped. Thus, a front side scene, through the windshield, including such as a signal S1 and a variety of traffic signs S2 is visible in the right side region of the display panel 3. Meanwhile, in a left side region of the display panel 3, an image produced by a navigation system is displayed by driving the pixel 31. The display panel 3 may be capable of partially displaying an image on the display screen as in the example of FIG. 8 or not capable of generating such a partial display.

A vehicle windshield is often mounted on a vehicle so as to incline a top edge thereof to an interior of the vehicle. The operation of attaching the display panel 3 to a surface of such windshield which faces the interior of the vehicle is carried out in a face-up state, therefore, it is very difficult to accurately position the display panel 3 in a predetermined position in such a state. Further, in the operation in such a difficult situation, the display panel 3 may not be able to be attached in an accurate position at first try, and correction of the position or retrial of the operation of the attaching may be required. Thus, there is a risk that the display panel 3 is broken through the additional operations. However, by using the method for attaching display panel according to the present embodiment, it is possible to attach the display panel 3 easily as well as accurately at the predetermined position even on the vehicle windshield.

In the example of FIG. 8, the frame-shaped body 4 is bonded in the vicinity of an upper edge of the windshield in front of a driver seat, however, the frame-shaped body 4 can be attached in any position on the windshield. The frame-shaped body 4 having a transverse width which is equivalent to a full width of the windshield may be bonded in the vicinity of the upper edge or a lower edge of the windshield throughout a vehicle width direction. In addition, a plurality of frame-shaped body 4 may be bonded to the windshield, and a plurality of display panels 3 may be attached.

Further, in the example of FIG. 8, the frame-shaped body 4 is bonded in an orientation in which the first rod-like member 1 is located at lower side, in gravitational direction during normal use of the vehicle, than the first ends 4c of the second rod-like members 2a, 2b. Therefore, a downward movement of the display panel 3 by a gravitational action can be restricted by the first rod-like member 1. On the other hand, a movement of the display panel 3 outward of the frame-shaped body 4 through the opening of the frame-shaped body 4 can be prevented by the gravitational action.

As shown in FIG. 8, it is preferable that at least one of the second rod-like members 2a, 2b is positioned at a position along a pillar P1 in the vicinity of the driver seat or a position along a pillar P2 in the vicinity of a passenger seat. This is because if the second rod-like members 2a, 2b are positioned in this way, at least one of the second rod-like members 2a, 2b is inconspicuous.

Furthermore, in the example of FIG. 8, the wiring board 9 extends to a space between an upholstery of the ceiling part in the interior of the vehicle and a roof of the vehicle at the upper edge of the windshield. The wiring plate 9 is inserted into a connector 21 disposed between the upholstery of the ceiling part and the roof of the vehicle. The connector 21 may be coupled to a driver (not shown) to supply a drive signal to the display panel 3. By way of such arrangement, it is possible to reduce a length of the wiring board 9. Further, the display panel 3 can be accurately attached at the predetermined position by using the method for attaching display panel 3 of the present embodiment, therefore, any excessiveness or shortage of the length of the wiring board from the display panel 3 to the connector 21 hardly occurs. Therefore, it is possible to reduce exposure of the wiring board 9 inside the interior of the vehicle.

Figure 9:
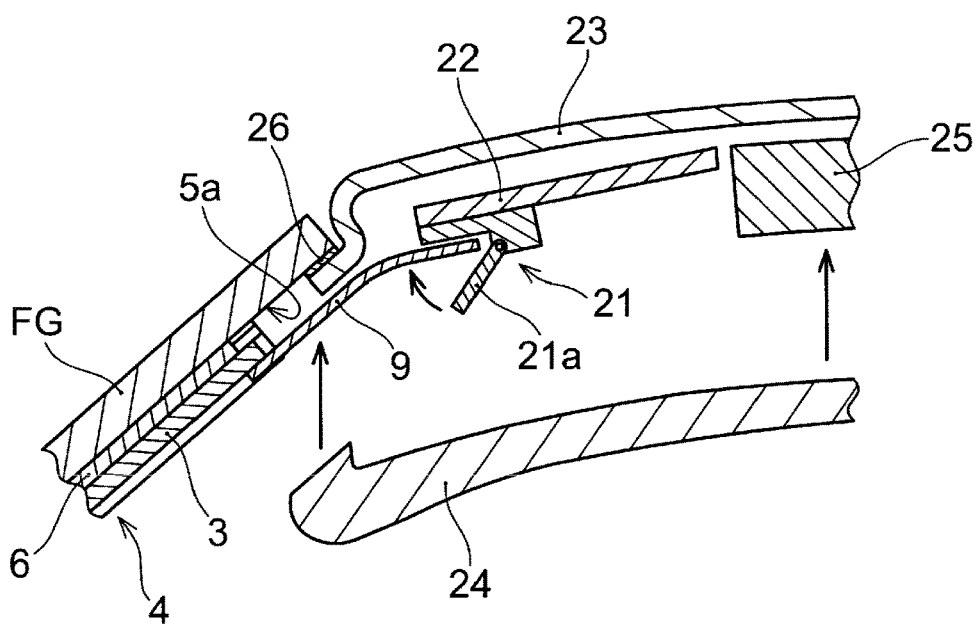
FIG. 9 shows a part of steps of the method for attaching display panel to vehicle windshield by using the method for attaching display panel according to Embodiment 1.

In FIG. 9, there is shown additional steps to be carried out in order to obtain the configuration illustrated in FIG. 8 in a case where the display panel 3 is attached to the vehicle windshield by using the method for attaching display panel of the present embodiment. As shown in FIG. 9, the method for attaching display panel to the windshield by using the method of the present embodiment may comprise the step of connecting the connector 21 that is disposed at the ceiling part in the interior of the vehicle and the flexible wiring board 9 that is connected to the display panel 3 to each other after the display panel 3 has been moved to the predetermined position. Afterwards, an upholstery material 24 to cover the connector 21 may be attached to the ceiling part in the interior of the vehicle. In the example of FIG. 9, the connector 21 is mounted on the substrate 22 on which a driver (not shown) to supply a drive signal to the display panel 3 has been mounted. The connector 21 is arranged at the predetermined position in a space provided between a roof 23 and the upholstery material 24 at the ceiling part in the interior of the vehicle. An upper end part of a surface (attaching target surface 5a) of a windshield FG facing the interior of the vehicle is bonded, using the adhesive 26, on a surface of an end part of the roof 23 facing the outside of the vehicle. Reference numeral 25 designates a sound insulator which is disposed between the roof 23 and the upholstery material 24.

Examples of the connector 21 include a connector such as a FPC-to-board type connector or a cable-to-board type connector, but the connector 21 is not limited thereto. Also, in FIG. 9, the connector 21 provided with a lock lever 21a is illustrated, but the connector 21 may not always be provided with the lock lever 21a, and may be of type to which FPC and cable are simply inserted. In addition, the connector 21 may not always be mounted on the substrate 22, and in that case, the connector 21 may be of cable-to-cable type.

After the display panel 3 has been moved to the predetermined position, an opposite end to the display panel 3 in the wiring board 9 is led into the ceiling part of the interior of the vehicle to which the upholstery material 24 is not yet furnished, and is connected to the connector 21. Then, the upholstery material 24 is attached to the ceiling part. The upholstery material 24 is formed using any material such as a synthetic resin, a fiber, leather or a metal. Means for attaching the upholstery material 24 to the ceiling part is not limited particularly, and the upholstery material 24 can be attached using general attaching means which is used to attach an upholstery material to an interior of the vehicle.

[Embodiment 2]

Figure 10A:
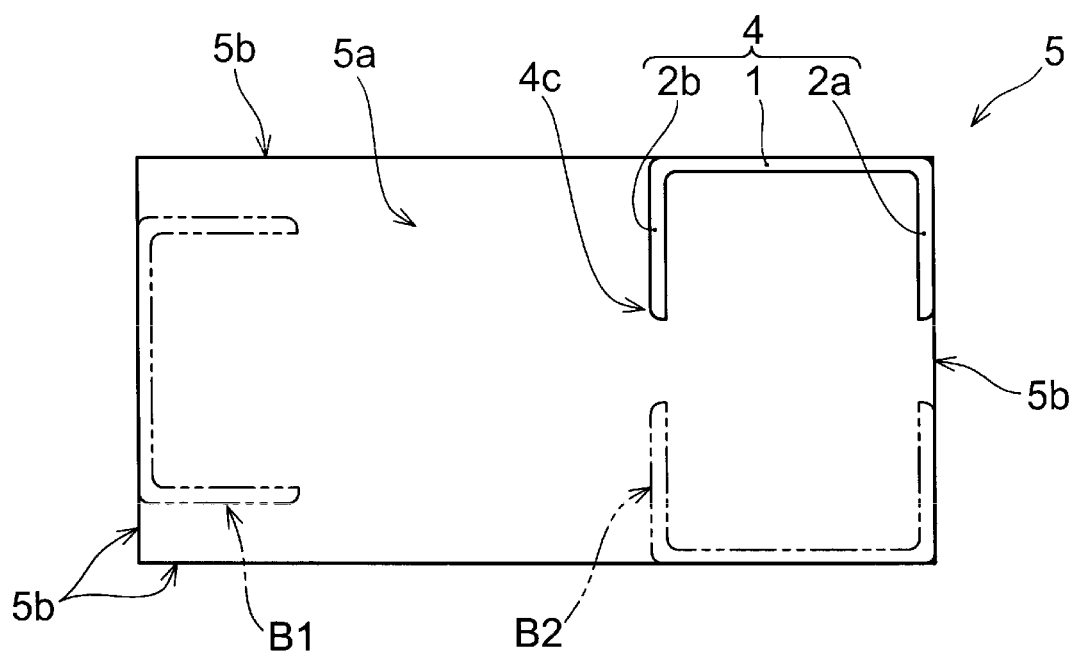
FIG. 10A shows an example of a state in which the frame-shaped body is bonded to an attaching target surface in a method for attaching display panel according to Embodiment 2 of the present invention.
Figure 10B:
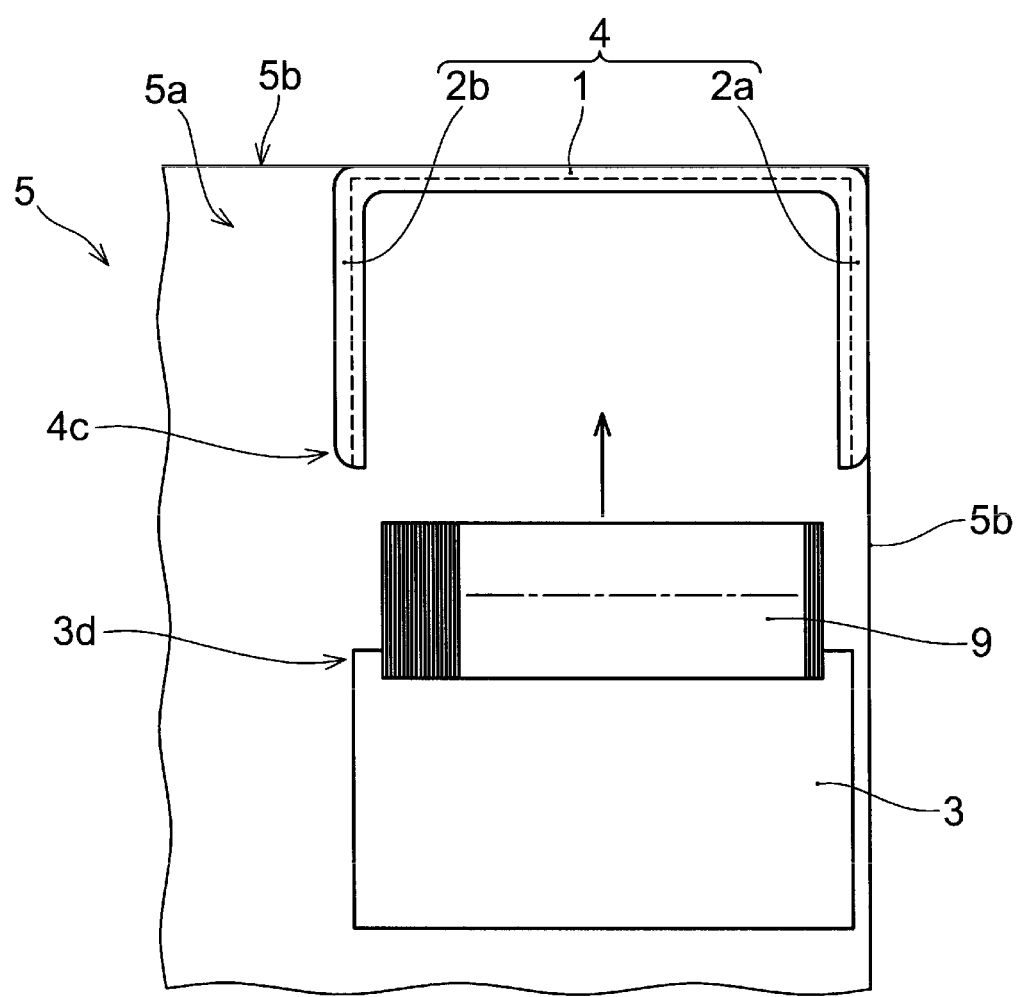
FIG. 10B shows an example of a step in which the display panel is moved towards the first rod-like member in the method for attaching display panel according to Embodiment 2.
Figure 10C:
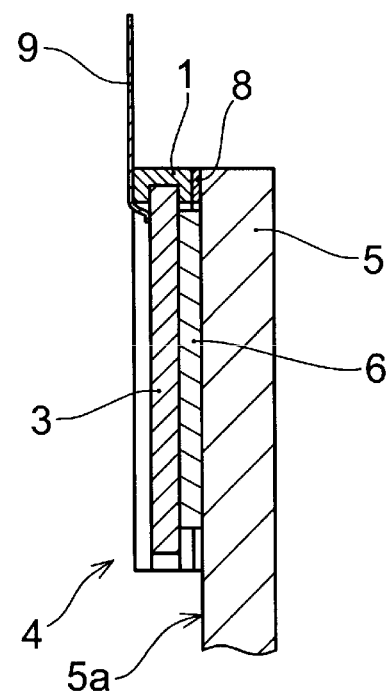
FIG. 10C shows an example of a mariner of drawing a wiring board outward of the frame-shaped body in the method for attaching display panel according to Embodiment 2.

Next, a method for attaching display panel according to Embodiment 2 will be described referring to FIG. 10A to FIG. 10C. In FIG. 10A to FIG. 10C, similar constituent elements to those shown in FIG. 6A to FIG. 6D described above are referred with the same reference numerals as those used in FIG. 6A to FIG. 6D, and a duplicate description of these constituent elements are appropriately omitted. Also, in FIG. 10A to FIG. 10C, the frame-shaped body 4 shown in FIG. 2A to FIG. 2C described above is shown as an example, however, in Embodiment 2 any of the examples shown in FIG. 3A, FIG. 3B, FIG. 4A and FIG. 5A to FIG. 5D may be prepared as the frame-shaped body 4. Further, modification may be applied to the frame-shaped body 4 which appropriately includes the first rod-like member 1 and the second rod-like members 2a, 2b, and such frame-shaped body 4 with the modification may be used.

The method for attaching display panel of Embodiment 2 is different from the method for attaching display panel of Embodiment 1 in that the first rod-like member 1 is bonded in the vicinity of an outer edge 5b on the attaching target surface 5a along the outer edge 5b of the object 5 having a surface that is the attaching target surface 5a. That is, as shown in FIG. 10A, the first rod-like member 1 is bonded to the edge of the attaching target surface 5a along the outer edge 5b of the attaching target surface 5a. On the other hand, the first ends 4c of the second rod-like member 2a, 2b and the opening of the frame-shaped body 4 are positioned to be closer to the center part of the attaching target surface 5a than the first rod-like member 1. It may be preferable to position the first rod-like member 1 so as to be along the outer edge 5b of the attaching target surface 5a because the first rod-like member 1 is made inconspicuous. It is further preferable that, as shown in FIG. 10A, either one of or both of the second rod-like members 2a, 2b are positioned so as to be along the outer edge of the attaching target surface 5a because at least one of the second rod-like members 2a, 2b is made inconspicuous.

The first rod-like member 1 can be positioned so as to be along any part of the outer edge 5b of the attaching target surface 5a. That is, the first rod-like member 1 may be positioned along a part of the edge 5b which is to be either an upper edge or a lower edge, assuming that gravitational direction faces downward, during use of the display panel 3 (refer to FIG. 10B). In addition, the first rod-like member 1 may be positioned so as to be along a part, of the outer edge 5b, which is substantially parallel to the gravitational direction during use of the display panel 3. For example, the frame-shaped body 4 may be bonded at a position B1 or a position B2 indicated by the chain double-dashed line in FIG. 10A.

In Embodiment 2 as well, as shown in FIG. 10B, the display panel 3 is led into the frame-shaped body 4 from the first ends 4c of the second rod-like members 2a, 2b and moved towards the first rod-like member 1. In Embodiment 2, the display panel 3 is moved, to the first rod-like member 1, with a fourth edge 3d to which the flexible wiring board 9 has been connected at the head. By positioning the fourth edge 3d ahead, it is possible to draw the wiring board 9 to the outside of the attaching target surface 5a in a short route. Therefore, it is possible to reduce the length of the wiring board 9 which has to reach a driver (not shown) disposed outside the attaching target surface 5a. Further, the wiring board 9 can be made inconspicuous.

Then, as shown in FIG. 10C, preferably, the display panel 3 is moved until the display panel 3 abuts against the first rod-like member 1. The wiring board 9 crosses over the first rod-like member 1 of the frame-shaped body 4, and is drawn outward of the frame-shaped body 4. Thus, the wiring board 9 can be supported by the first rod-like member 1 during use of the display panel 3. Excessive vibration of the wiring board 9 is restricted, and a stress applied to a bonding part between the wiring board 9 and the display panel 3 can be reduced. For example, as described above, in a case where the method for attaching display panel of Embodiment 2 is used for the vehicle windshield, the stress which may occur owing to the vibration of the vehicle while running and may be applied to the wiring board 9 and the bonding part between the wiring board 9 and the display panel 3 can be reduced.

In the method for attaching display panel of Embodiment 2 as well, after the display panel 3 has been moved to the predetermined position, the display panel 3 may be pressed towards the attaching target surface 5a by using a similar manner to the manner described referring to FIG. 6D. In addition, the method for manufacturing display apparatus described above may comprise the steps included in the method for attaching display panel of Embodiment 2.

[Summary]

(1) A method for attaching display panel according to Embodiment 1 of the present invention is characterized by comprising: preparing a frame-shaped body comprising a first rod-like member and two second rod-like members, the two second rod-like members being substantially parallel to each other and crossing the first rod-like member; bonding the first rod-like member and the two second rod-like members to a given plane surface or a given curved surface; and moving a display panel having a width to be supported between the two second rod-like members from one of the ends of two second rod-like members towards the first rod-like member along a first surface of the two second rod-like members and a second surface of the two second rod-like members, the first surface and the second surface facing each other.

According to the configuration of (1), it is possible to easily attach a display panel at a proper position on a given plane surface or a given curved surface and thereafter it is possible to easily detach the display panel from the attaching target surface as required.

(2) In the method for attaching display panel of (1), moving a display panel towards the first rod-like member may comprise: moving the display panel with each of two opposite edges of the display panel being inserted into concave portion provided on the first surface and the second surface of the second rod-like members.

According to the configuration of (2), movement of the display panel in a direction in which the display panel is separated from the surface on which the display panel has been attached can be prevented almost surely.

(3) The method for attaching display panel of (1) or (2) may further comprise: forming a weak adhesive layer on the plane surface or curved surface, or on a surface of the display panel, the surface being arranged to face the plane surface or curved surface, by using an adhesive agent before moving the display panel from the one of the ends of two second rod-like members towards the first rod-like member; and pressing the display panel against the plane surface or curved surface after moving the display panel to a predetermined position, so that the display panel and the plane surface or curved surface closely contact with each other via the weak adhesive layer.

According to the configuration of (3), the display panel and the given plane surface or the given curved surface can be substantially securely brought into close contact with each other and it is possible to easily detach the display panel, as required, from the surface with which the display panel has been brought into close contact.

(4) In the method for attaching display panel of (3), pressing the display panel against the plane surface or curved surface may further comprise: shifting a position of the display panel to be pressed from a vicinity of the first rod-like member towards the ends of two second rod-like members.

According to the configuration of (4), it is possible to effectively discharge air, through an opening of the frame-shaped body to the outside thereof, which may be air bubbles in an interface between the weak adhesive layer and the display panel or between the weak adhesive layer and the given plane surface or curved surface.

(5) In the method for attaching display panel of (3) or (4), the weak adhesive layer may be formed using an adhesive agent to develop adhesiveness by applying pressure.

According to the configuration of (5), when the display panel is moved towards the first rod-like member, even in a case where the display panel and the weak adhesive layer come into contact with each other, or, even in a case where the given plane surface or curved surface and the weak adhesive layer come into contact with each other, it is possible to move the display panel smoothly without any problem.

(6) In the method for attaching display panel of any one of (1) to (5), the first rod-like member may be bonded to the plane surface or curved surface at a position to be lower than the one of the ends of two second rod-like members in a gravitational direction during use of the display panel.

According to the configuration of (6), movement of a display panel outward of the frame-shaped body through an opening of the frame-shaped body (between the ends of two second rod-like members) can be restricted by gravity.

(7) In the method for attaching display panel of any one of (1) to (6), the first rod-like member may be bonded along an outer edge of an object comprising a surface to be the plane surface or curved surface in a vicinity of the outer edge.

According to the configuration of (7), it is possible to bring the first rod-like member into inconspicuous to a user of the display panel.

(8) The method for attaching display panel of any one of (1) to (7), may further comprise: drawing a wiring board outward of the frame-shaped body, wherein the display panel is moved towards the first rod-like member with an edge to which the flexible wiring board has been connected at the head; and the wiring board is drawn outward of the frame-shaped body over the first rod-shaped member of the frame-shaped body.

According to the configuration of (8), it is possible to support the wiring board with the first rod-like member. For example, excessive vibration of the wiring board is restricted, and a stress applied to a bonding part between the wiring board and the display panel can be reduced.

(9) In the method for attaching display panel of any one of (1) to (8), the first rod-like member may comprise a part curving so as to be convex towards an opposite direction to a direction facing the ends of second rod-like members.

According to the configuration of (9), it is possible to appropriately attach the display panel having a curved outer edge onto the given plane surface or the given curved surface.

(10) A method for attaching display panel to vehicle windshield comprising t the plane surface or curved surface by using the method for attaching display panel of any one of (1) to (9), may comprise: connecting a connector disposed on a ceiling part in an interior of a vehicle and a flexible wiring board connected to the display panel to each other after moving the display panel to a predetermined position; and attaching an upholstery material to cover the connector to the ceiling part.

According to the configuration of (10), it is possible to connect the display panel and an external device connected to the connector to each other with the short wiring board, and it is possible to prevent exposure of the connector and the external device or the like to an interior of the vehicle.

(11) A method for manufacturing display apparatus according to another embodiment of the present invention is characterized by comprising: preparing a frame-shaped body comprising a first rod-like member and two second rod-like members, the two second rod-like members being parallel to each other and crossing the first rod-like member; bonding the first rod-like member and the two second rod-like members to a given plane surface or a given curved surface; forming a display panel having a width to be supported between the two second rod-like members; and attaching the display panel to the given plane surface or given curved surface, wherein attaching the display panel to the given plane surface or given curved surface comprising: moving the display panel from one of the ends of two second rod-like members towards the first rod-like member along a first surface of the two second rod-like members and a second surface of the two second rod-like members, the first surface and the second surface facing each other.

According to the configuration of (11), it is possible to obtain a display apparatus in which the display panel can be easily detached from the given plane surface or the given curved surface on which the display panel has been attached.

DESCRIPTION OF REFERENCE NUMERALS

1 First rod-like member
2a, 2b Second rod-like member
3 Display panel
3a First edge
3b Second edge
3d Fourth edge
4 Frame-shaped body
4a First surface
4b Second surface 4c First end
4e, 4e1, 4e2, 4e3 Concave portion
5a Attaching target surface (surface)
5b Outer edge
6 Weak adhesive layer
9 Wiring board
10 Display apparatus
21 Connector
24 Upholstery material

The invention claimed is:

1. A method for attaching display panel to vehicle windshield comprising a plane surface or curved surface by using a method for attaching display panel comprising: preparing a frame-shaped body comprising a first rod-like member and two second rod-like members, the two second rod-like members being substantially parallel to each other and crossing the first rod-like member; bonding the first rod-like member and the two second rod-like members to a given plane surface or a given curved surface; and moving a display panel having a width to be supported between the two second rod-like members from one of the ends of two second rod-like members towards the first rod-like member along a first surface of the two second rod-like members and a second surface of the two second rod-like members, the first surface and the second surface facing each other;
connecting a connector disposed on a ceiling part in an interior of a vehicle and a flexible wiring board connected to the display panel to each other after moving the display panel to a predetermined position; and
attaching an upholstery material to cover the connector to the ceiling part.

2. The method for attaching display panel to vehicle windshield according to claim 1, wherein moving a display panel towards the first rod-like member comprises:
moving the display panel with each of two opposite edges of the display panel being inserted into concave portion provided on the first surface and the second surface of the second rod-like members.

3. The method for attaching display panel to vehicle windshield according to claim 1, wherein the method for attaching display panel further comprising:
forming a weak adhesive layer on the plane surface or curved surface, or on a surface of the display panel, the surface being arranged to face the plane surface or curved surface, by using an adhesive agent before moving the display panel from the one of the ends of two second rod-like members towards the first rod-like member; and
pressing the display panel against the plane surface or curved surface after moving the display panel to a predetermined position, so that the display panel and the plane surface or curved surface closely contact with each other via the weak adhesive layer.

4. The method for attaching display panel to vehicle windshield according to claim 3, wherein pressing the display panel against the plane surface or curved surface further comprises:
shifting a position of the display panel to be pressed from a vicinity of the first rod-like member towards the ends of two second rod-like members.

5. The method for attaching display panel to vehicle windshield according to claim 3, wherein the weak adhesive layer is formed using an adhesive agent to develop adhesiveness by applying pressure.

6. The method for attaching display panel to vehicle windshield according to claim 1, wherein the first rod-like member is bonded to the plane surface or curved surface at a position to be lower than the one of the ends of two second rod-like members in a gravitational direction during use of the display panel.

7. The method for attaching display panel to vehicle windshield according to claim 1, wherein the first rod-like member is bonded along an outer edge of an object comprising a surface to be the plane surface or curved surface in a vicinity of the outer edge.

8. The method for attaching display panel to vehicle windshield according to claim 1, wherein the method for attaching display panel further comprising:
drawing the flexible wiring board outward of the frame-shaped body, wherein
the display panel is moved towards the first rod-like member with an edge to which the flexible wiring board has been connected at the head; and
the flexible wiring board is drawn outward of the frame-shaped body over the first rod-shaped member of the frame-shaped body.

9. The method for attaching display panel to vehicle windshield according to claim 1, wherein the first rod-like member comprises a part curving so as to be convex towards an opposite direction to a direction facing the ends of second rod-like members.

* * * * *